United States Patent
Kawagoe et al.

(10) Patent No.: US 6,784,658 B2
(45) Date of Patent: Aug. 31, 2004

(54) SIGNAL GENERATOR FOR MULTI-CYLINDER INTERNAL COMBUSTION ENGINE AND ROTATION INFORMATION DETECTOR USING SIGNAL GENERATOR

(75) Inventors: Jun Kawagoe, Numazu (JP); Yoshikazu Tsukada, Numazu (JP); Yoshinobu Arakawa, Numazu (JP); Kouji Sasaki, Numazu (JP)

(73) Assignee: Kokusan Denki Co., Ltd., Shizuoka-ken (JP)

( * ) Notice: Subject to any disclaimer, the term of this patent is extended or adjusted under 35 U.S.C. 154(b) by 15 days.

(21) Appl. No.: 10/375,565

(22) Filed: Feb. 27, 2003

(65) Prior Publication Data

US 2003/0164154 A1 Sep. 4, 2003

(30) Foreign Application Priority Data

Mar. 1, 2002 (JP) .......................................... 2002-056472

(51) Int. Cl.$^7$ .............................. G01P 3/46; G01P 3/04; F01L 13/02; F02P 9/00
(52) U.S. Cl. ..................... 324/163; 123/41 E; 123/617; 73/510
(58) Field of Search ............................. 324/160, 163; 123/200–201, 41 R, 41 E, 612, 617; 73/488, 510

(56) References Cited

U.S. PATENT DOCUMENTS 5,127,387 A  *  7/1992  Matsuo .................... 123/617
5,794,574 A      8/1998  Bostelmann et al.
6,405,687 B1 *  6/2002  Arakawa et al. ........ 123/41 E

* cited by examiner

Primary Examiner—Bot LeDynh
(74) Attorney, Agent, or Firm—Pearne & Gordon LLP

(57) ABSTRACT

A signal generator for an internal combustion engine for obtaining precise information on a rotational direction of the engine when the engine runs at extremely low speed, comprising: a rotor having a first series of reluctor corresponding to a cylinder of the engine, and a second series of reluctor having a predetermined phase relationship relative to the first series of reluctor; and a first sensor and a second sensor that detect the first series of reluctor and the second series of reluctor, respectively of the rotor to generate pulses, wherein a positional relationship between the first and the second series of reluctors, and a positional relationship between the first and the second sensors are set so that a difference occurs in a phase relationship between an output pulse of the first sensor and that of the second sensor in forward rotation and in reverse rotation of the engine.

16 Claims, 21 Drawing Sheets

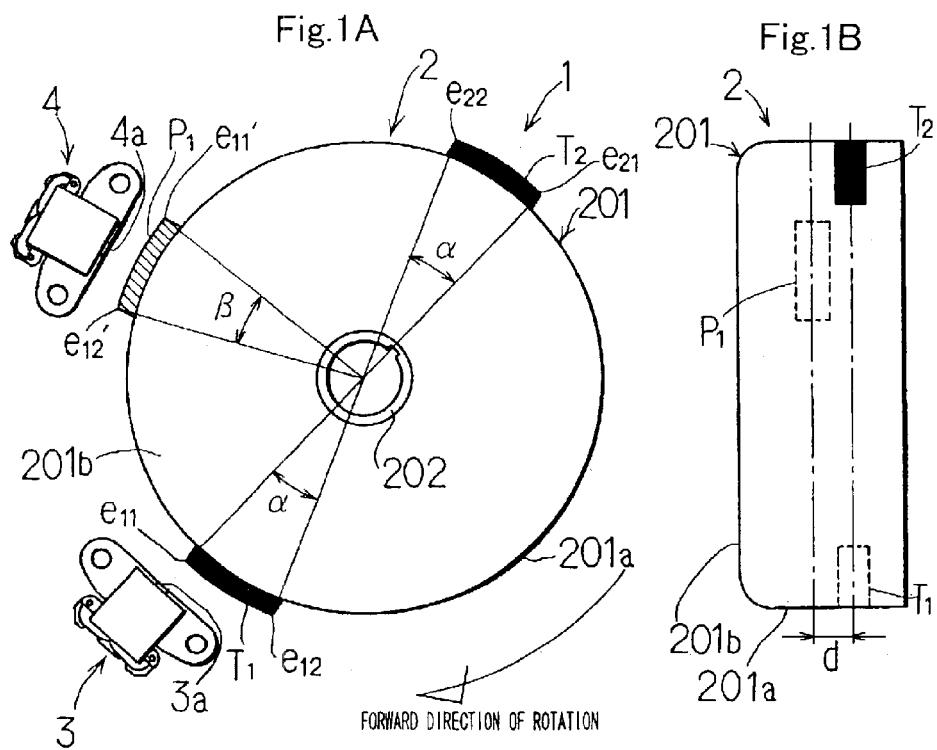
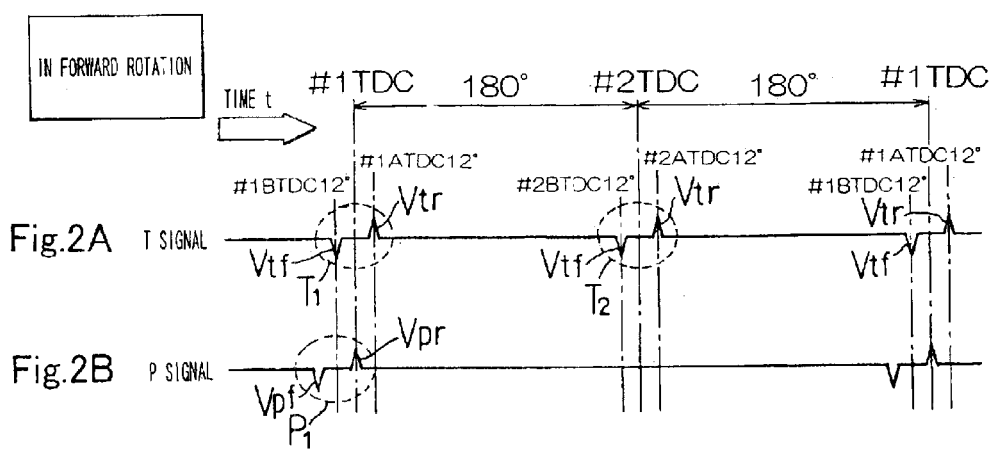

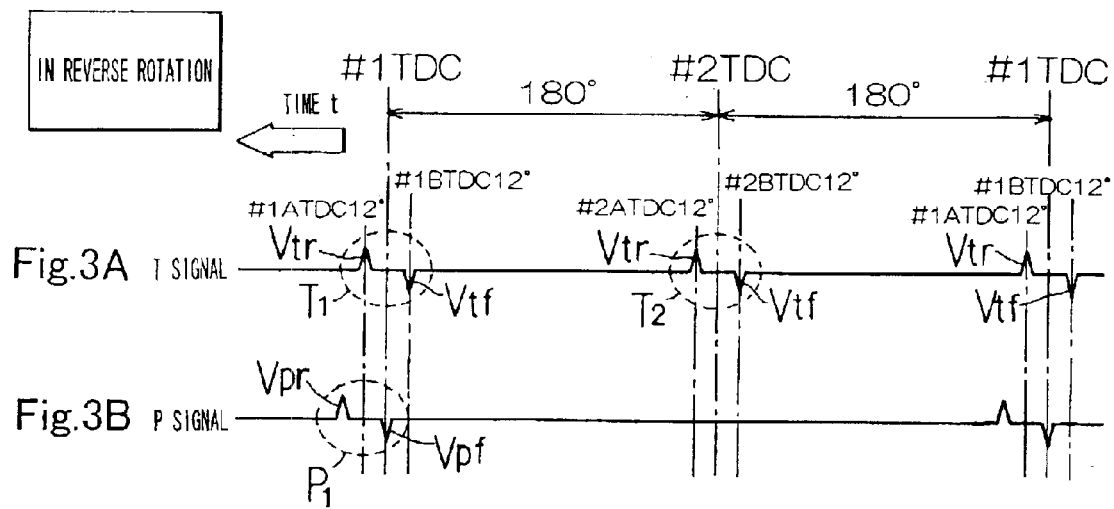
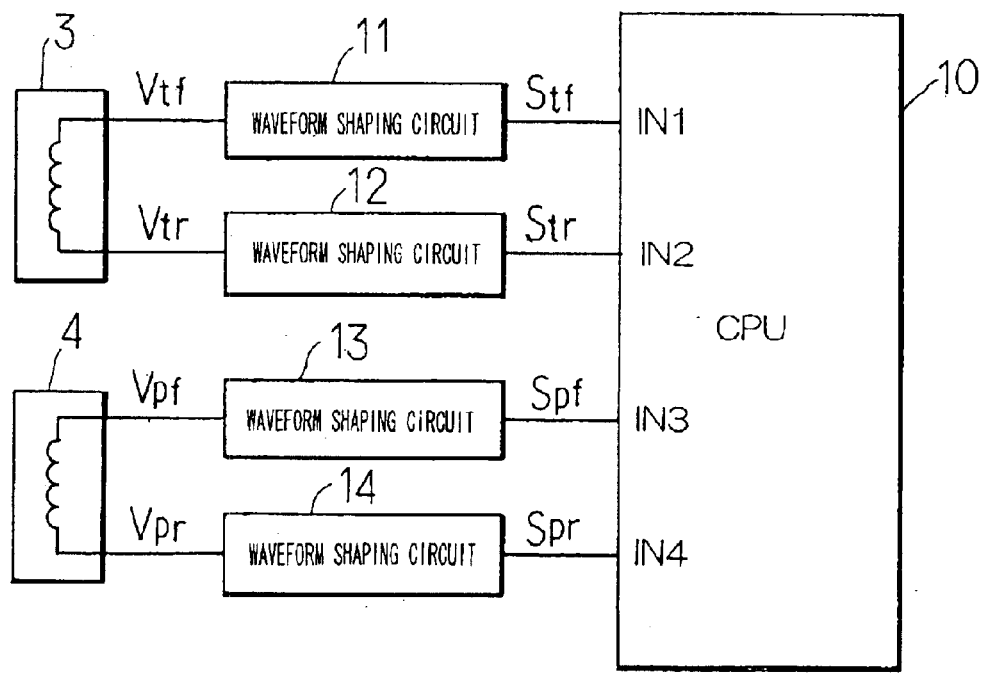

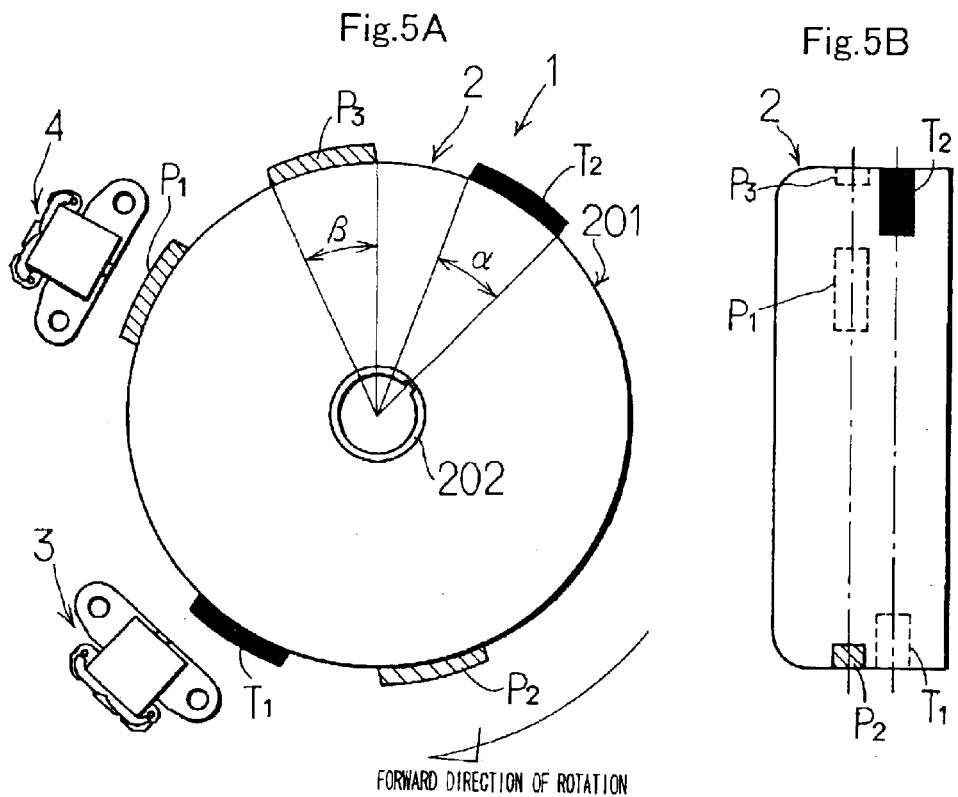
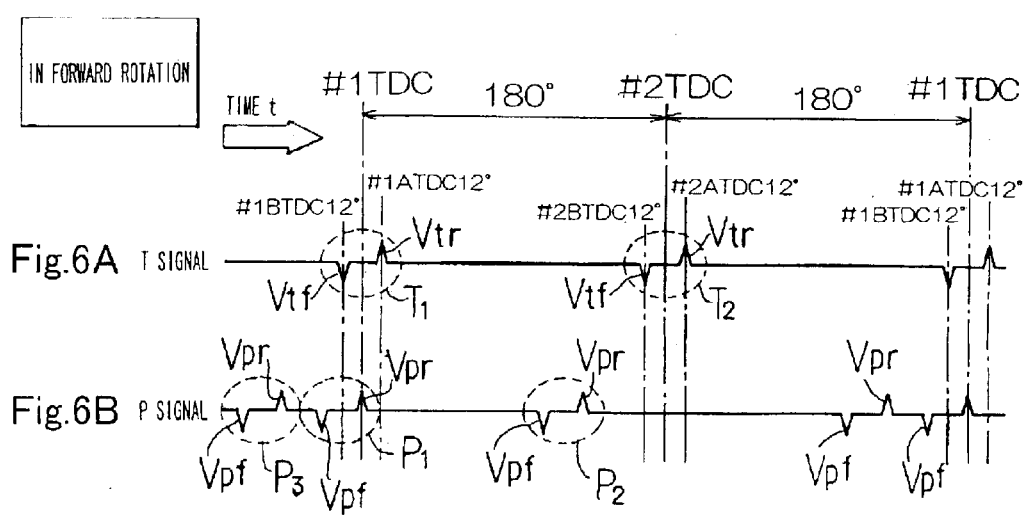

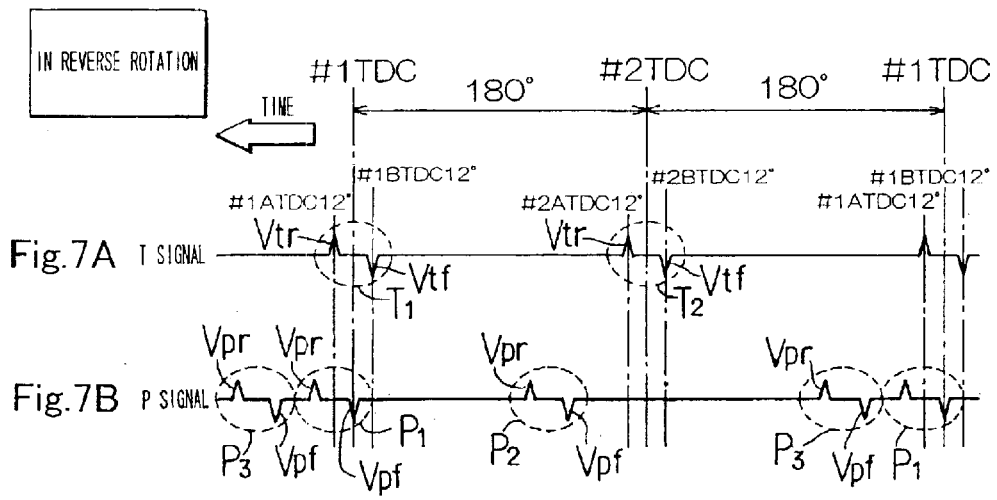
Fig.7A T SIGNAL
Fig.7B P SIGNAL
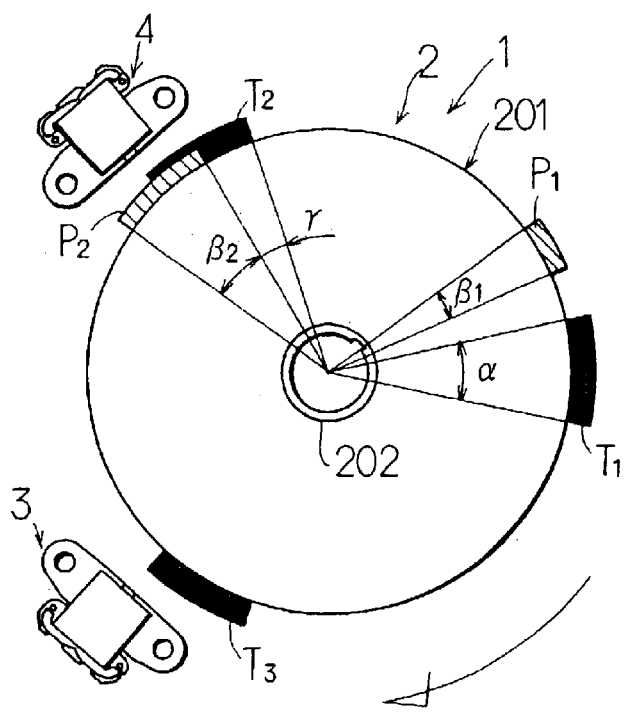
Fig.8A
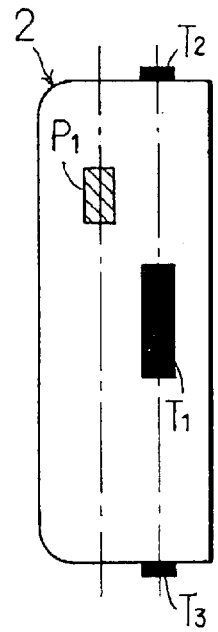
Fig.8B

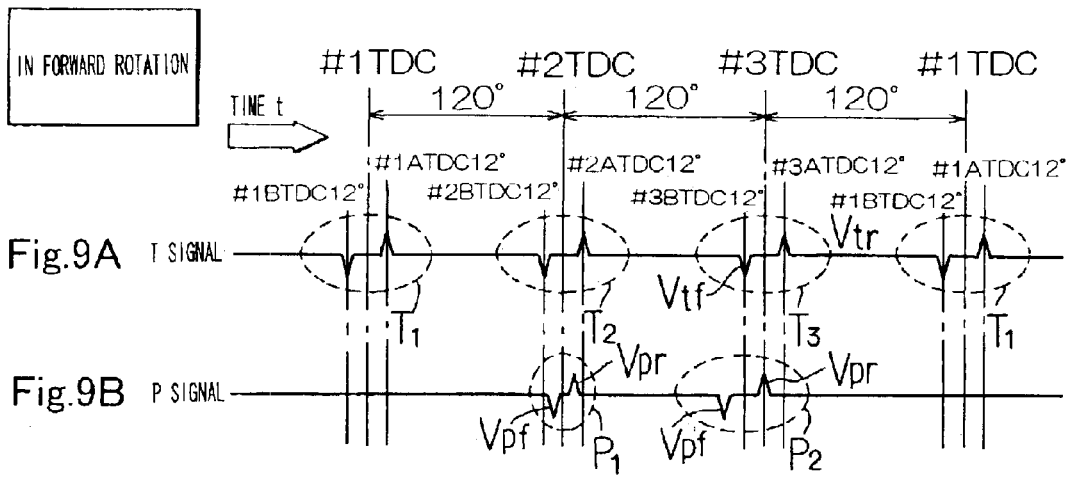
Fig.9A  T SIGNAL
Fig.9B  P SIGNAL
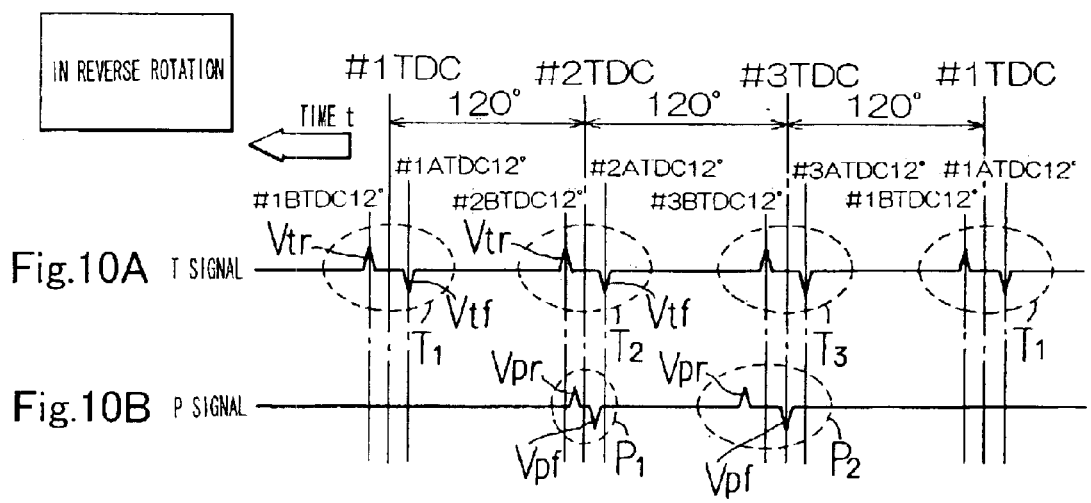
Fig.10A  T SIGNAL
Fig.10B  P SIGNAL Fig.11
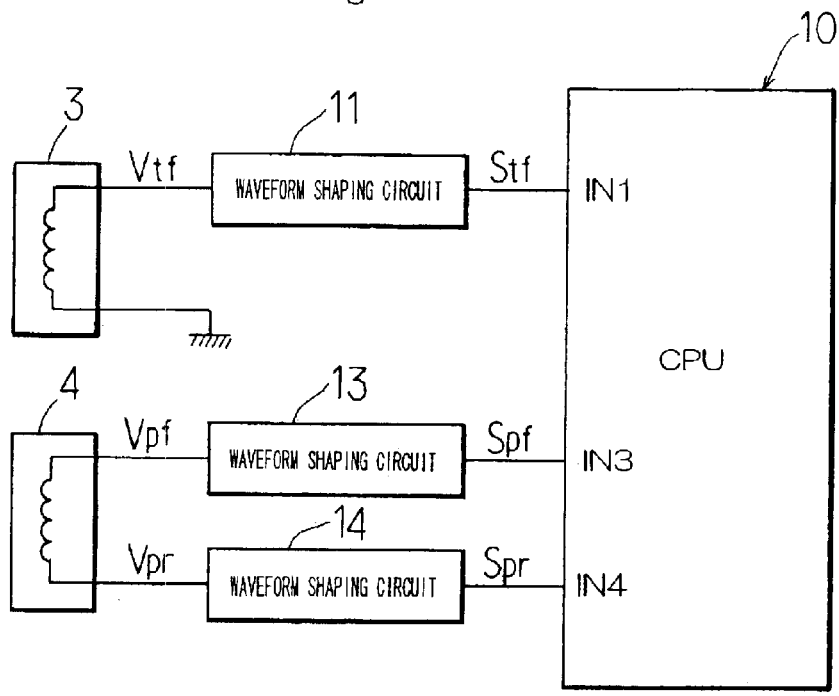
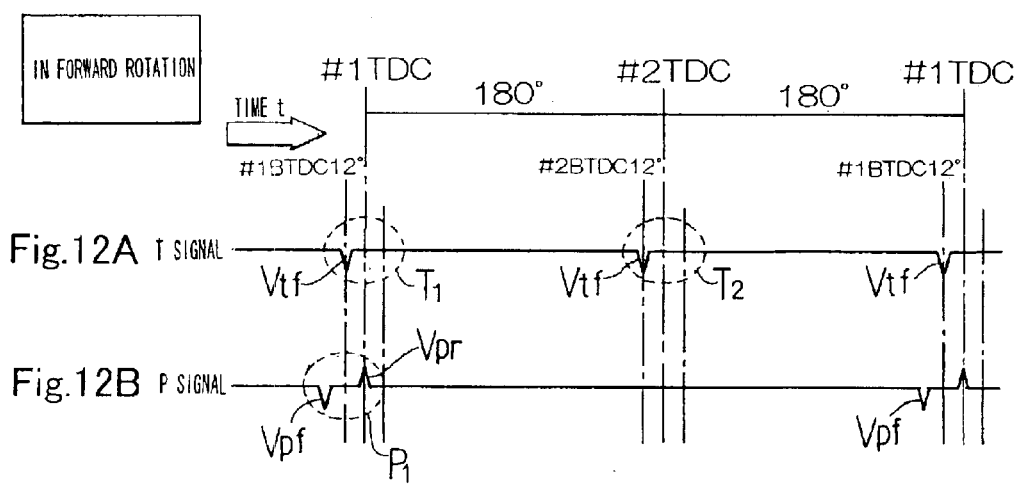
Fig.12A
Fig.12B

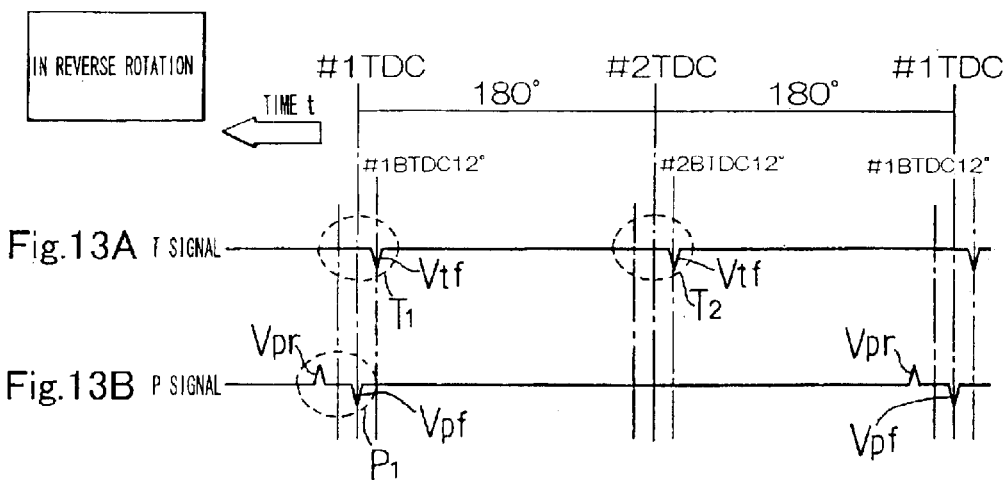
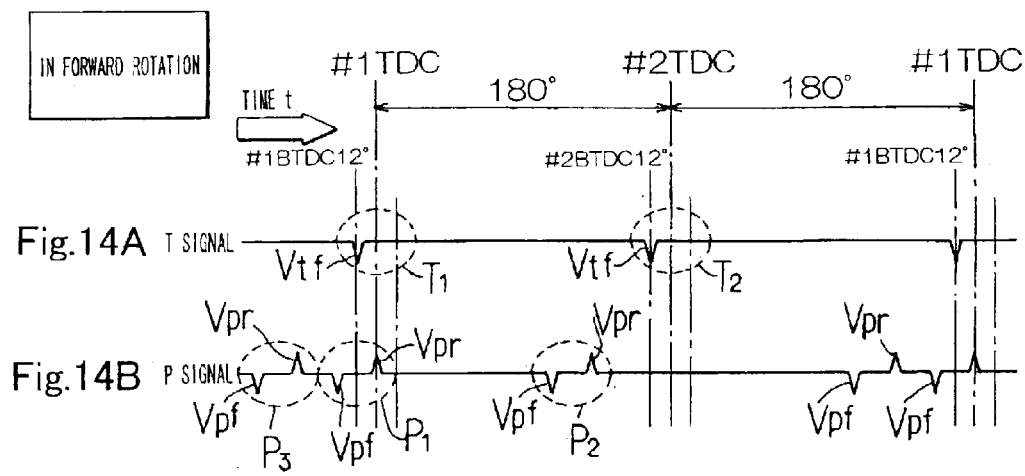

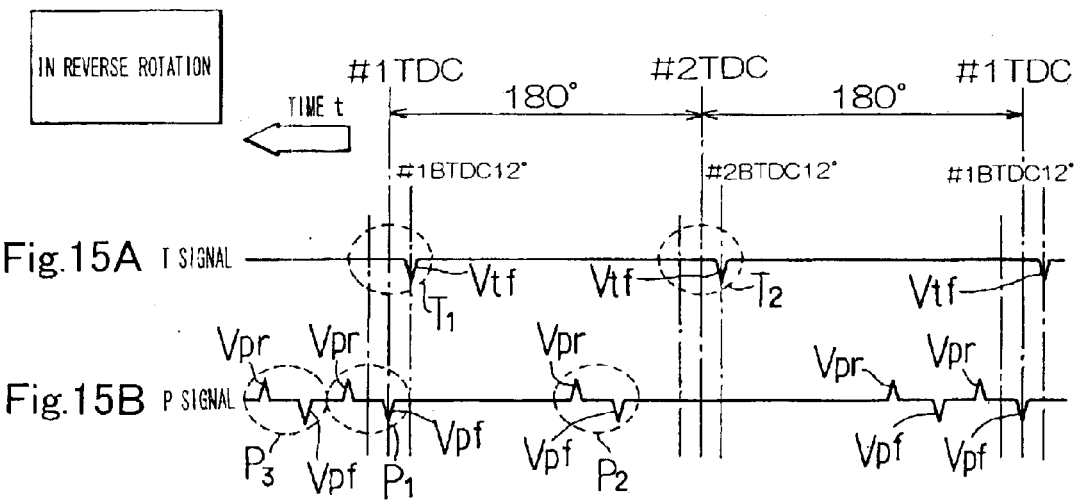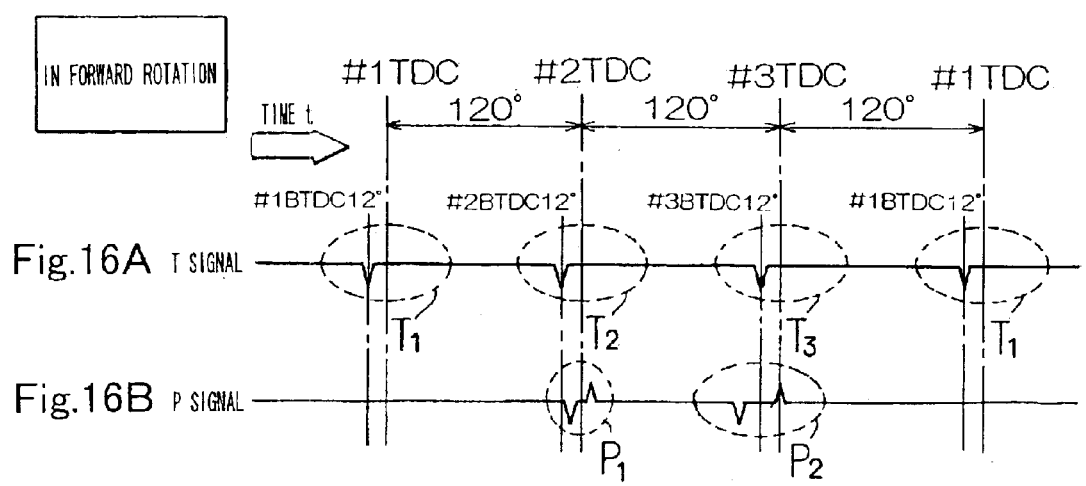

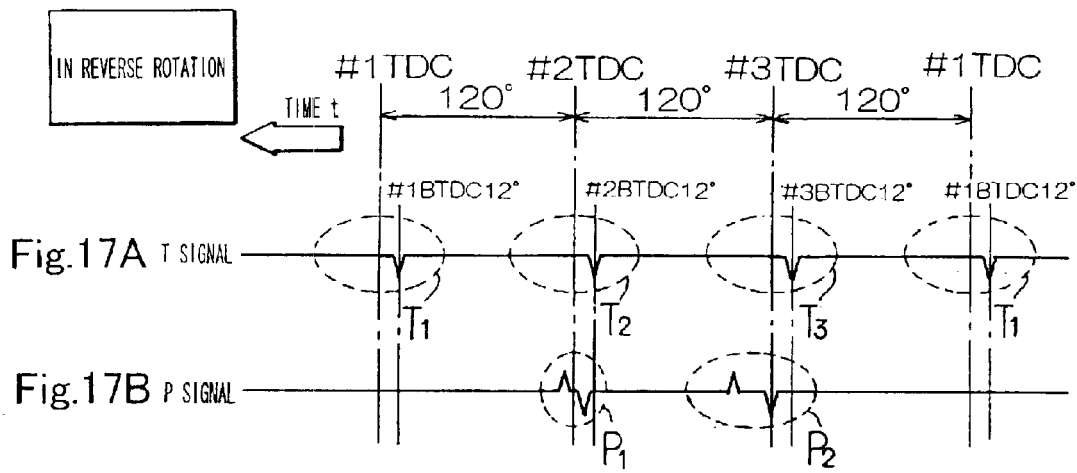
Fig.17A T SIGNAL
Fig.17B P SIGNAL
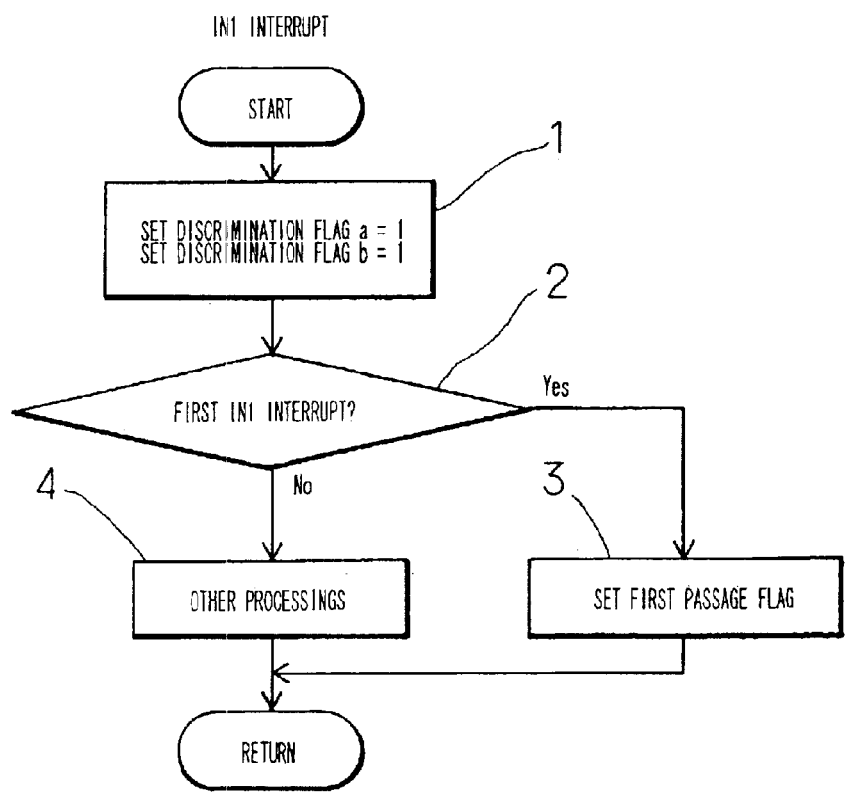
Fig.18

| DISCRIMINATION FLAG | | DISCRIMINATION RESULT |
|---|---|---|
| a | b | |
| 0 | 0 | ABNORMAL |
| 0 | 1 | #1 CYLINDER REVERSE ROTATION |
| 1 | 0 | #1 CYLINDER FORWARD ROTATION |
| 1 | 1 | #2 CYLINDER |

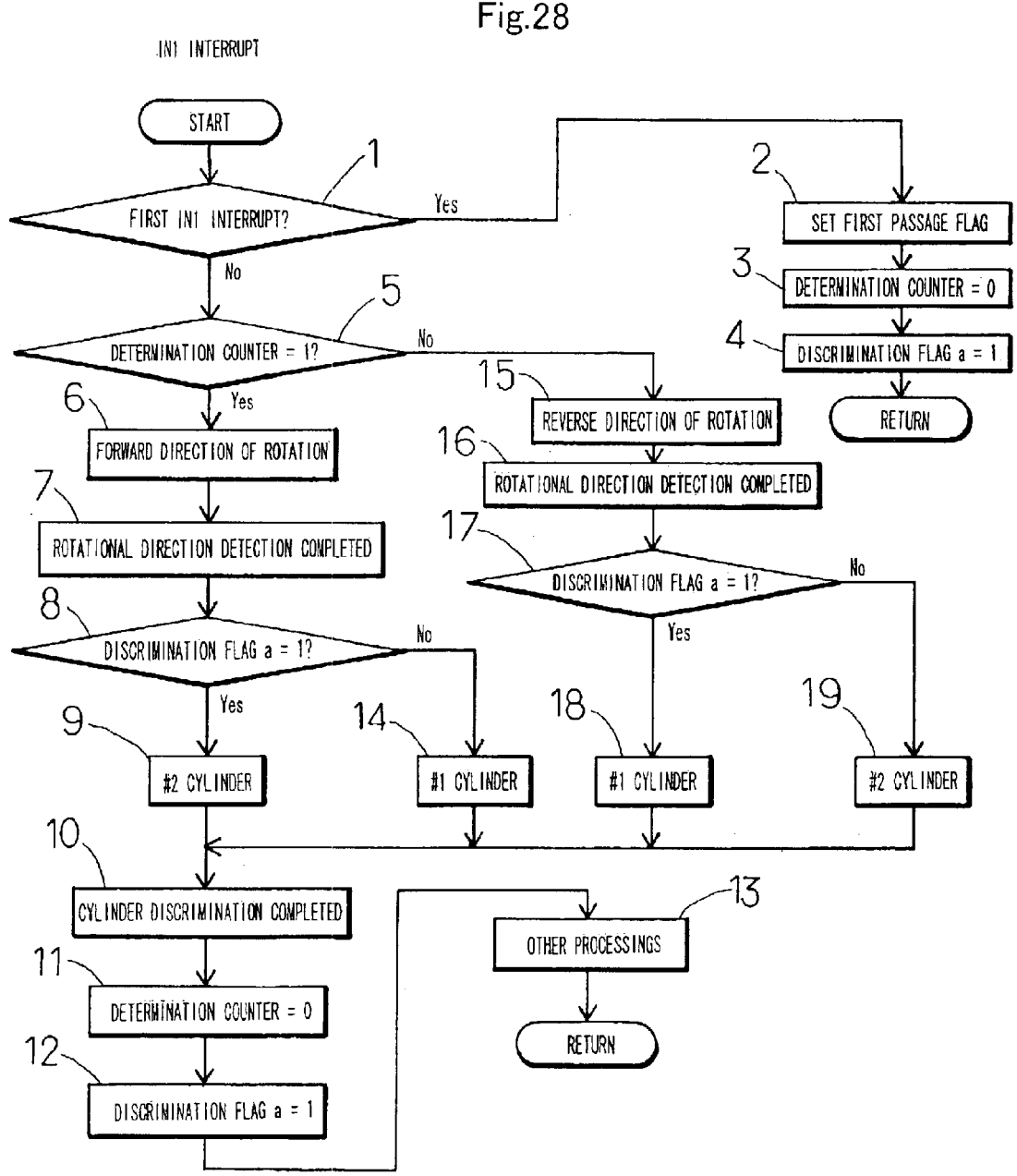

SIGNAL GENERATOR FOR MULTI-CYLINDER INTERNAL COMBUSTION ENGINE AND ROTATION INFORMATION DETECTOR USING SIGNAL GENERATOR

TECHNICAL FIELD OF THE INVENTION

The present invention relates to a rotation information detector for detecting rotation information including information on a rotational direction of an internal combustion engine, and a signal generator used in the detector.

BACKGROUND OF THE INVENTION

In many vehicles such as scooters, snowmobiles, or buggies that value simplicity of use, a two cycle internal combustion engine is frequently used as a driving source. Such vehicles often use a variable speed type transmission of a centrifugal clutch type, which does not have a back-up gear, as a transmission provided between a crankshaft of the engine and a driving wheel. However, even a vehicle that uses such a simple transmission is desirably backed using an engine when a body is heavy or a snowmobile having crashed into snow is backed.

Thus, it has been supposed that when a two cycle internal combustion engine is used as a driving source, a feature of the two cycle internal combustion engine that allows rotation in both forward and reverse directions is used to allow reversal of a rotational direction of the engine in accordance with a driver's instruction, thereby permitting the engine to be driven in both forward and reverse rotation states.

A known method for reversing a rotational direction of a two cycle internal combustion engine is such that in accordance with a driver's reversal instruction, a rotational speed of the engine is lowered to a set rotational speed below an idling speed by fuel cut, engine misfire, or ignition timing delay, the ignition timing is then excessively advanced to reverse the rotational direction of the engine, and after the reversal of the rotational direction of the engine is confirmed, the ignition timing of the engine is shifted to timing suitable for keeping driving of the engine with the rotational direction reversed.

For reversing the rotational direction of the internal combustion engine by such a method to drive the engine in the forward and the reverse rotation states, obtaining information on the rotational direction of the engine is essential.

An internal combustion engine built in a vehicle using a transmission with a gear for backing up sometimes requires obtaining information on the rotational direction of the engine in order to prevent the reverse rotation of the engine.

When the ignition timing of the internal combustion engine is controlled by a microprocessor, a predetermined rotational angle position (crank angle position) of a crankshaft of the engine is set as a reference position, the ignition timing is arithmetically operated relative to timing at which the rotational angle position of the crankshaft corresponds to the reference position, and measuring the arithmetically operated ignition timing is started when the rotational angle position of the crankshaft corresponds to the reference position. Thus, in this case, it is necessary to be able to detect that the rotational angle position of the crankshaft corresponds to the reference position.

Further, when the engine runs at extremely low speed, the rotational speed of the crankshaft varies minutely due to changes in strokes of the engine, and precise measurement of the ignition timing arithmetically operated by the microprocessor is difficult. Thus, when the engine runs at extremely low speed, it is preferable that the ignition is not performed at the ignition timing arithmetically operated by the microprocessor, but is performed at predetermined fixed ignition timing. In the case where the ignition is performed at the fixed ignition timing when the engine runs at extremely low speed (when the rotational angle position of the crankshaft corresponds to a fixed ignition position), it is necessary to be able to detect that the rotational angle position of the crankshaft corresponds to a position corresponding to the ignition timing when the engine runs at extremely low speed.

When the ignition timing is controlled by the microprocessor, the rotational speed of the engine is calculated by measuring time for the crankshaft to rotate by a fixed angle.

In order to obtain various rotation information such as the information on the rotational direction of the internal combustion engine, the information on the reference position of the crankshaft, the information on the ignition position when the engine runs at extremely low speed, or the information on the rotational speed, a signal generator is widely used that comprises a rotor in the form of an inductor having a reluctor and provided to rotate in synchronization with the engine, and a sensor that detects a leading edge and a trailing edge in a rotational direction of the reluctor of the rotor to generate a leading edge detection pulse and a trailing edge detection pulse having different polarities.

A known method for obtaining information on a rotational direction of an engine using such a signal generator is disclosed in U.S. Pat. No. 5,794,574. In the prior art, two sensors are placed at a predetermined interval around a rotor in the form of an inductor having two reluctors, and information on whether the engine rotates forward or reversely is obtained using a feature that a relationship between a length of a time period between when one of the sensors detects a trailing edge of one reluctor of the rotor to generate a trailing edge detection pulse and when the other sensor detects a leading edge of one reluctor to generate a leading edge detection pulse, and a length of a time period when the other sensor detects a trailing edge of the other reluctor to generate a trailing edge detection pulse and when one sensor detects the leading edge of one reluctor to generate the leading edge detection pulse differs in forward rotation and in reverse rotation of the engine.

When the rotational speed of the crankshaft of the internal combustion engine is constant, as the method disclosed in the above U.S. Patent, comparing generation intervals of particular pulses allows the rotational speed of the engine to be reliably discriminated. However, when the engine runs at extremely low speed, the rotational speed of the crankshaft varies during one rotation of the crankshaft due to changes in strokes of the engine, thus the above described method may cause erroneous discrimination of the rotational direction.

For a multi-cylinder internal combustion engine having two or more cylinders, provided on a rotor side with a reluctor corresponding to each cylinder of the engine, it is necessary to obtain information (cylinder discrimination information) for discriminating which cylinder a series of pulses, generated by a sensor detecting a leading edge and a trailing edge of a series of reluctors, corresponds to, but the signal generator disclosed in the above U.S. patent cannot provide such cylinder discrimination information.

SUMMARY OF THE INVENTION

Therefore, an object of the invention is to provide a signal generator for an internal combustion engine capable of generating a signal for obtaining precise rotation information including information on a rotational direction of an engine and cylinder discrimination information even when the engine runs at extremely low speed at which a rotational speed of a crankshaft widely varies.

Another object of the invention is to provide a rotation information detector for an internal combustion engine that uses the above described signal generator to obtain rotation information including information on a rotational direction of an engine and cylinder discrimination information.

The invention provides a signal generator used for detecting rotation information including information on a rotational direction of a multi-cylinder internal combustion engine having two or more cylinders and cylinder discrimination information, and a rotation information detector using the signal generator.

The signal generator according to the invention comprises: a rotor in the form of an inductor having a first series of reluctors as many as cylinders of the internal combustion engine, that are provided correspondingly to each cylinder of the internal combustion engine and are rotated together with a crankshaft around a central axis of the crankshaft of the internal combustion engine, and a second series of at least one reluctor that is provided in a position shifted axially along the crankshaft relative to the first series of reluctors and is rotated together with the first series of reluctors; a first sensor that detects a leading edge and a trailing edge in a rotational direction of the first series of reluctors of the rotor to generate a leading edge detection pulse and a trailing edge detection pulse having different polarities; and a second sensor that detects a leading edge and a trailing edge in a rotational direction of the second series of reluctor of the rotor to generate a leading edge detection pulse and a trailing edge detection pulse having different polarities, wherein polar arc angles of the first and the second series of reluctors, a positional relationship between the first and the second sensors, and a positional relationship between the first and the second series of reluctors are set so that the second sensor detects the leading edge or the trailing edge of the second series of one reluctor to generate one pulse while the first sensor sequentially detects at least one leading edge and at least one trailing edge of the first series of reluctors to generate the leading edge detection pulse and the trailing edge detection pulse.

In the invention, each of the first series of reluctors is provided correspondingly to each cylinder of the engine. "Providing each reluctor correspondingly to each cylinder" means that each reluctor is placed in a position suitable for generating a pulse, from the first sensor, that includes crank angle information required for controlling each cylinder, when the first sensor detects the reluctor corresponding to each cylinder.

For example, when ignition timing of the internal combustion engine is controlled relative to a rotational speed, a pulse generated in a fixed crank angle position by the signal generator is sometimes used as a signal for determining the ignition timing (fixed ignition signal) when the internal combustion engine starts or runs at extremely low speed at which the precise ignition timing arithmetically operated by the microcomputer cannot be measured. In such a case, the reluctor corresponding to each cylinder is placed so that it is generated the pulse that may be used as the fixed ignition signal for each cylinder when the first sensor detects the edge of the reluctor corresponding to each cylinder.

When ignition timing of a multi-cylinder internal combustion engine, at which a series of cylinders are sequentially ignited at crank angle positions at equal mechanical angle intervals, is controlled, the first series of reluctors as many as the cylinders of the engine are basically placed at equal angle intervals in order to generate the fixed ignition signal for each cylinder from the first sensor. However, in this case, the invention is not limited to the case where the first series of reluctors are placed at precisely equal angle intervals, but the positions of some of the first series of reluctors may be shifted from the positions where all the first series of reluctors are placed at equal intervals without the ignition timing when each cylinder of the engine starts and runs at extremely low speed departing from an acceptable variation range.

For example, when ignition timing of a two cylinder internal combustion engine is controlled, a first series of two reluctors are preferably provided at a 180° interval, but an angle between the two reluctors may be slightly shifted from 180° without a generation position of a fixed ignition signal for determining ignition timing of each cylinder departing from an acceptable range. That is, in this case, the first series of two reluctors may be provided at a substantially 180° interval.

As described above, the signal generator is comprised so as to include the first series of reluctors and the second series of reluctor; the first sensor that detects the leading edge and the trailing edge of the first series of reluctors to generate the leading edge detection pulse and the trailing edge detection pulse; and the second sensor that detects the leading edge and the trailing edge of the second series of reluctor to generate the leading edge detection pulse and the trailing edge detection pulse, wherein the second sensor detects the leading edge or the trailing edge of the second series of one reluctor to generate one pulse while the first sensor sequentially detects at least one leading edge and at least one trailing edge of the first series of reluctors to generate the leading edge detection pulse and the trailing edge detection pulse. Thus, a difference occurs in a phase relationship between the pulse generated by the first sensor and the pulse generated by the second sensor in forward rotation of the crankshaft, and in a phase relationship between the pulse generated by the first sensor and the pulse generated by the second sensor in reverse rotation of the crankshaft. This is because reversal of the rotational direction of the internal combustion engine causes the leading edge detection pulse and the trailing edge detection pulse to change their generation positions.

Thus, in the signal generator according to the present invention, the difference occurs in the phase relationship between the output pulse of the first sensor and the output pulse of the second sensor in the forward rotation and in the reverse rotation of the internal combustion engine. Therefore, detecting various events caused by the difference in the phase relationship may provide the rotation information such as the information on the rotational direction of the engine, or the information on the cylinder corresponding to the pulse generated by the first sensor.

To find the difference in the phase relationship between the output pulse of the first sensor and the output pulse of the second sensor, it is basically sufficient to observe order of generation of the leading edge detection pulse and the trailing edge detection pulse by both sensors, and measuring time between the pulses is not required. Thus, the above described way of obtaining the information on the rotational direction of the engine allows the precise information on the rotational direction of the engine to be obtained even when the engine runs at extremely low speed at which the rotational speed of the crankshaft varies.

Further, in the signal generator comprised as described above, the second sensor generates one pulse while the first sensor detects the reluctor corresponding to a particular cylinder to sequentially generate the leading edge detection pulse and the trailing edge detection pulse, thus discriminating whether the second sensor generates one pulse while the first sensor sequentially generates the leading edge detection pulse and the trailing edge detection pulse provides cylinder discrimination information on which cylinder of the internal combustion engine the leading edge detection pulse and the trailing edge detection pulse sequentially generated by the first sensor correspond to.

Thus, the rotation information detector for the multi-cylinder internal combustion engine may be comprised by achieving rotational direction discrimination means for obtaining the information on the rotational direction from the output pulse of the signal generator and cylinder discrimination means for obtaining the cylinder discrimination information from the output pulse of the signal generator, which are provided by inputting the pulse output by the signal generator to a CPU to cause the CPU to execute a predetermined program.

The rotational direction discrimination means may be comprised so as to discriminate the rotational direction of the engine using a feature that the phase relationship between the leading edge detection pulse and the trailing edge detection pulse generated by the first sensor and the leading edge detection pulse and the trailing edge detection pulse generated by the second sensor differs depending on the rotational direction of the engine.

Also, the cylinder discrimination means may be comprised so as to discriminate that, when the second sensor generates one pulse while the first sensor sequentially generates the leading edge detection pulse and the trailing edge detection pulse, the leading edge detection pulse and the trailing edge detection pulse sequentially generated by the first sensor correspond to the particular cylinder of the internal combustion engine.

The difference in the phase relationship between the pulses generated by the first and the second sensors in the forward rotation and in the reverse rotation of the engine may be detected from changes in various events caused by the changes in the phase relationship between the output pulses of the first and the second sensors due to the reversal of the rotational direction.

For example, the rotational direction discrimination means may be comprised so as to obtain the information on the rotational direction of the engine using a feature that, when the rotational direction of the internal combustion engine is reversed, a polarity of one pulse (the leading edge detection pulse or the trailing edge detection pulse) generated by the second sensor between when the first sensor generates the leading edge detection pulse and when the first sensor generates the trailing edge detection pulse is reversed (the leading edge detection pulse and the trailing edge detection pulse generated by the second sensor change their generation positions in the forward rotation and in the reverse rotation of the engine).

In addition, the rotational direction discrimination means may be comprised so as to obtain the information on the rotational direction of the engine using a feature that the number of leading edge detection pulses or the trailing edge detection pulses generated by the second sensor between when the first sensor generates one leading edge detection pulse and when the first sensor generates a next leading edge detection pulse differs depending on the rotational direction of the engine Further, the rotational direction discrimination means may be comprised so as to obtain the information on the rotational direction of the engine using a feature that the number of leading edge detection pulses or the trailing edge detection pulses generated by the second sensor between when the first sensor generates one trailing edge detection pulse and when the first sensor generates a next trailing edge detection pulse differs depending on the rotational direction of the engine.

In the signal generator comprised as described above, a position of each pulse generated by each sensor in the forward rotation and in the reverse rotation of the engine is fixed, thus recognizing the pulse generated by each sensor may provide the information on the rotational angle position of the engine, and besides, measuring an elapsed time between generation times of the particular pulses (a time required for fixed angular rotation of the crankshaft) may provide the information of the rotational speed of the engine.

In the above description, the rotational direction of the internal combustion engine is discriminated using the feature that the phase relationship between the leading edge detection pulse and the trailing edge detection pulse generated by the first sensor and the leading edge detection pulse and the trailing edge detection pulse generated by the first sensor differs depending on the rotational direction of the crankshaft. However, the rotational direction of the internal combustion engine may be discriminated based on a phase relationship between a pulse with one polarity (the leading edge detection pulse or the trailing edge detection pulse) generated by the first sensor and the leading edge detection pulse and the trailing edge detection pulse generated by the second sensor.

Further, it may be discriminated which cylinder of the internal combustion engine the pulse generated by the first sensor corresponds to, from a polarity or the number of pulses generated by the second sensor between when the first sensor generates the pulse with one polarity and when the first sensor generates a pulse with the same polarity again.

When comprised as described above, the rotation information including the information on the rotational direction of the engine and the cylinder discrimination information can be obtained simply by reading in the CPU three pulses: one of the leading edge detection pulse and the trailing edge detection pulse generated by the first sensor, and the leading edge detection pulse and the trailing edge detection pulse generated by the second sensor, thus saving input ports of the CPU.

As described above, there are provided the first series of reluctor corresponding to each cylinder of the internal combustion engine, and the first sensor that detects the leading edge and the trailing edge of the first series of reluctor to generate the leading edge detection pulse and the trailing edge detection pulse, and the polar arc angle and the position of the first series of reluctor corresponding to each cylinder are suitably set, thus the leading edge detection pulse generated by the first sensor may be used as a pulse for determining the ignition timing or injection start timing when each cylinder runs at low speed in the forward rotation and in the reverse rotation of the engine.

Further, as described above, there are provided the second series of reluctor, and the second sensor that detects the leading edge and the trailing edge in the rotational direction of the second series of reluctor to generate the leading edge detection pulse and the trailing edge detection pulse, and the polar arc angle and the position of the second series of reluctor are suitably set, thus the pulse generated by the second sensor may be used as a signal for determining measurement start timing of the ignition timing or determining injection start timing of fuel in the forward rotation and in the reverse rotation.

BRIEF DESCRIPTION OF THE DRAWINGS

The above and other objects and features of the invention will be apparent from the detailed description of the preferred embodiments of the invention, which are described and illustrated with reference to the accompanying drawings, in which;

FIG. 1A is a front view of a construction example of a signal generator used in a first embodiment of the invention;

FIG. 1B is a right side view of the signal generator in FIG. 1A;

FIG. 2 shows waveforms of pulses obtained by a sensor of the signal generator in FIG. 1A in forward rotation of an engine;

FIGS. 3A and 3B show waveforms of pulses obtained by the sensor of the signal generator in FIG. 1 in reverse rotation of the engine;

FIG. 4 is a schematic block diagram of a construction example of a circuit for inputting output pulses of a first sensor and a second sensor of the signal generator in FIG. 1 to a CPU of a microprocessor;

FIGS. 5A and 5B are a front view and a right side view of a construction example of a signal generator used in a second embodiment of the invention;

FIGS. 6A and 6B show waveforms of pulses obtained by a sensor of the signal generator in FIGS. 5A and 5B in the forward rotation of the engine;

FIGS. 7A and 7B show waveforms of pulses obtained by the sensor of the signal generator in FIGS. 5A and 5B in the reverse rotation of the engine;

FIGS. 8A and 8B are a front view and a right side view of a construction example of a signal generator used in a third embodiment of the invention;

FIGS. 9A and 9B show waveforms of pulses obtained by a sensor of the signal generator in FIGS. 8A and 8B in the forward rotation of the engine;

FIGS. 10A and 10B show waveforms of pulses obtained by the sensor of the signal generator in FIGS. 8A and 8B in the reverse rotation of the engine;

FIG. 11 is a schematic block diagram of a construction example of a circuit for inputting output pulses of a first sensor and a second sensor of the signal generator to a CPU of a microprocessor in a fifth embodiment of the invention;

FIGS. 12A and 12B show waveforms of pulses input to the CPU from the first sensor and the second sensor in the forward rotation of the engine when the signal generator in FIGS. 1A and 1B is used in the fifth embodiment of the invention;

FIGS. 13A and 13B show waveforms of pulses input to the CPU from the first sensor and the second sensor in the reverse rotation of the engine when the signal generator in FIGS. 1A and 1B is used in the fifth embodiment of the invention;

FIGS. 14A and 14B show waveforms of pulses input to the CPU from the first sensor and the second sensor in the forward rotation of the engine when the signal generator in FIGS. 5A and 5B is used in the fifth embodiment of the invention;

FIGS. 15A and 15B show waveforms of pulses input to the CPU from the first sensor and the second sensor in the reverse rotation of the engine when the signal generator in FIGS. 5A and 5B is used in the fifth embodiment of the invention;

FIGS. 16A and 16B show waveforms of pulses input to the CPU from the first sensor and the second sensor in the forward rotation of the engine when the signal generator in FIGS. 8A and 8B is used in the fifth embodiment of the invention;

FIGS. 17A and 17B show waveforms of pulses input to the CPU from the first sensor and the second sensor in the reverse rotation of the engine when the signal generator in FIGS. 8A and 8B is used in the fifth embodiment of the invention;

FIG. 18 is a flowchart of an interrupt routine algorithm for a program executed by the CPU in the first and the second embodiments of the invention;

FIG. 27 is a table showing relationships between discrimination flags used in the program in FIGS. 23 to 26 and discrimination results;

FIG. 28 is a flowchart of an interrupt routine algorithm for a program executed by the CPU in a fourth embodiment of the invention;

DETAILED DESCRIPTION OF THE PREFERRED EMBODIMENTS

Figure 19:
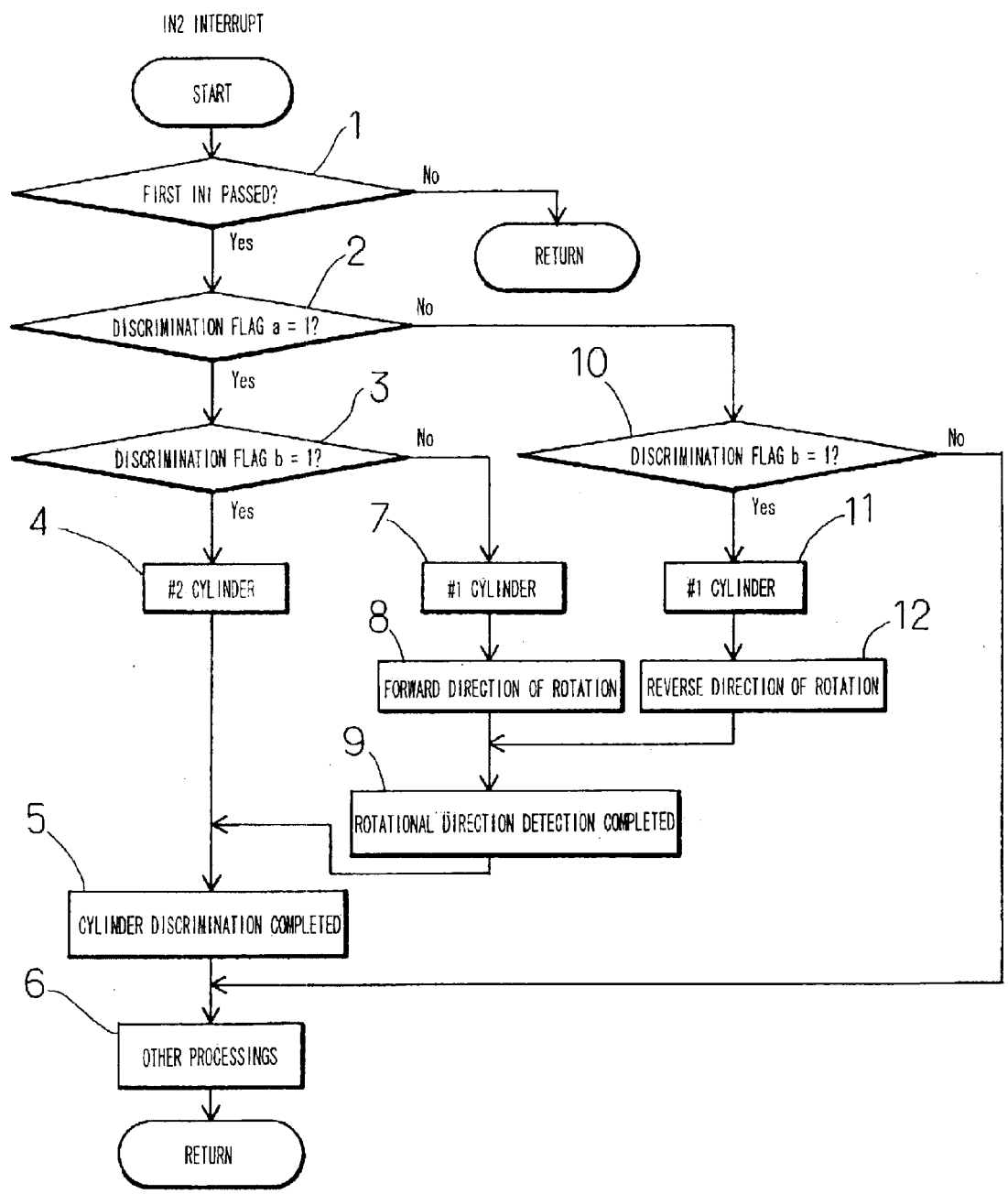
FIG. 19 is a flowchart of another interrupt routine algorithm for the program executed by the CPU in the first and the second embodiments of the invention.

Now, construction examples of a signal generator for an internal combustion engine and a rotation information detector using the signal generator according to the invention will be described with reference to the drawings.

First Embodiment

FIG. 1 shows a construction of a signal generator 1 used in a first embodiment of the present invention. In this embodiment, it is supposed that an internal combustion engine (not shown) has two cylinders.

The signal generator 1 according to this embodiment comprises: a rotor 2 in the form of an inductor having a first series of two reluctors T1, T2 that are placed at a 180° interval in a rotational direction of a crankshaft of the internal combustion engine correspondingly to two cylinders of the internal combustion engine and are rotated together with the crankshaft around a central axis of the crankshaft, and a second series of at least one reluctor P1 that is provided in a position shifted axially along the crankshaft relative to the first series of reluctors and is rotated together with the first series of reluctors T1, T2; a first sensor 3 that detects a leading edge and a trailing edge in each rotational direction of the first series of two reluctors T1, T2 of the rotor 2 to generate a leading edge detection pulse and a trailing edge detection pulse having different polarities; and a second sensor 4 that detects a leading edge and a trailing edge in a rotational direction of the second series of reluctor P1 of the rotor 2 to generate a leading edge detection pulse and a trailing edge detection pulse having different polarities.

In the signal generator 1, polar arc angles of the first and the second series of reluctors, a positional relationship between the first and the second sensors, and a positional relationship between the first and the second series of reluctors are set so that the second sensor 4 detects the leading edge or the trailing edge of the second series of one reluctor P1 to generate either of the leading edge detection pulse or the trailing edge detection pulse while the first sensor 3 sequentially detects the leading edge and the trailing edge of one of the first series of two reluctors T1, T2 to generate the leading edge detection pulse and the trailing edge detection pulse, and so that the second sensor 4 generates no pulse while the first sensor 3 sequentially detects the leading edge and the trailing edge of the other of the first series of two reluctors T1, T2 to generate the leading edge detection pulse and the trailing edge detection pulse.

When the signal generator is used to comprise a rotation information detector for detecting rotation information including information on a rotational direction of a two cylinder internal combustion engine and cylinder discrimination information, besides the above described signal generator, there are provided rotational direction discrimination means for discriminating the rotational direction of the internal combustion engine based on a phase relationship between the leading edge detection pulse and the trailing edge detection pulse generated by the first sensor and the leading edge detection pulse and the trailing edge detection pulse generated by the second sensor; and cylinder discrimination means for discriminating that, when the second sensor generates the leading edge detection pulse or the trailing edge detection pulse while the first sensor of the signal generator sequentially detects the leading edge and the trailing edge of one of the first series of two reluctors to generate the leading edge detection pulse and the trailing edge detection pulse, the leading edge detection pulse and the trailing edge detection pulse generated when the first sensor detects the leading edge and the trailing edge of one of the first series of reluctors correspond to one cylinder of the internal combustion engine, and for discriminating that, when the second sensor generates no pulse while the first sensor sequentially detects the leading edge and the trailing edge of the other of the first series of reluctors to sequentially generate the leading edge detection pulse and the trailing edge detection pulse, the leading edge detection pulse and the trailing edge detection pulse generated when the first sensor detects the leading edge and the trailing edge of the other of the first series of reluctors correspond to the other cylinder of the internal combustion engine.

More specifically, the rotor 2 is comprised of a cup-like rotor yoke 201 made of iron; the first series of two reluctors T1, T2 formed symmetrically (180° apart) on a periphery of a peripheral wall 201a of the rotor yoke and having the same polar arc angle, and the second series of one reluctor P1; and a boss 202 formed in a center of the bottom wall 201b is fitted to the crankshaft of the unshown internal combustion engine and screwed onto the crankshaft by appropriate means.

The reluctors T1, T2, P1 are comprised of arc protrusions (teeth) formed by protruding a part of the peripheral wall of the rotor yoke 201 outwardly by embossing or the like.

The reluctors (inductor magnetic poles) T1, T2, P1 rapidly change air gaps between magnetic poles of the sensors 3, 4 and the rotor as described below. In the shown example, the reluctors are comprised of the protrusions (teeth), but the reluctors may be comprised of grooves.

The first series of reluctors T1, T2 are provided correspondingly to a first cylinder and a second cylinder, respectively of the engine. The reluctor T1 is provided so that the leading edge is detected by the sensor 3 when a rotational angle position of the crankshaft corresponds to a set position set in an advanced position at a predetermined angle relative to a top dead center position (a rotational angle position of the crankshaft when a piston in the first cylinder reaches a top dead center) of the first cylinder. The reluctor T2 is provided so that the leading edge is detected by the sensor 3 when a rotational angle position of the crankshaft corresponds to a set position set in an advanced position at a predetermined angle relative to a top dead center position (a rotational angle position of the crankshaft when a piston in the second cylinder reaches a top dead center) of the second cylinder.

In the forward rotation of the engine, edges e11, e21 at one end and edges e12, e22 at the other end as shown of the reluctors T1, T2 are the leading edges and the trailing edges in the rotational direction, and in the reverse rotation of the engine, the edges e12, e22 at the other end and the edges e11, e21 at one end as shown of the reluctors T1, T2 are the leading edges and the trailing edges in the rotational direction.

The second series of reluctor P1 is provided mainly for obtaining the information on the rotational direction and the information for cylinder discrimination (in the case of the multi-cylinder engine), and is placed 90° apart forward in the rotational direction of the engine in the forward rotation of the engine relative to the first series of reluctor T1.

In the forward rotation of the engine, an edge e11' at one end and an edge e12' at the other end as shown of the second series of reluctor P1 are the leading edge and the trailing edge in the rotational direction, and in the reverse rotation of the engine, the edge e12' at the other end and the edge e11' at one end are the leading edge and the trailing edge in the rotational direction.

The first series of reluctors T1, T2 and the second series of reluctor P1 are provided at a certain distance d therebetween (see FIG. 1B) axially along the crankshaft.

In the shown example, the first series of reluctors T1, T2 are formed on an opening side of the yoke 201 (an opposite side of the bottom wall 201b), and the second series of reluctor P1 is formed on a bottom wall 201b side of the yoke 201.

The first sensor 3 is known and comprises a casing accommodating a core having at a tip a magnetic pole 3a facing a surface provided with the reluctor T1 of the rotor 2, a signal coil wound around the core, and a permanent magnet magnetically coupled to the core, and such a sensor is referred to as a pulser. The sensor 3 is placed with the magnetic pole 3a radially facing the rotor 2 and positioned to face the first series of reluctors T1, T2, and is secured to a sensor mounting portion provided in a securing position on a case or a cover of the engine.

The signal coil in the sensor 3 outputs the leading edge detection pulse and the trailing edge detection pulse having different polarities in response to changes of a magnetic flux caused in the core when the magnetic pole 3a at the tip of the core of the sensor starts facing the leading edge in the rotational direction of each of the reluctors T1, T2 (when the leading edge in the rotational direction of each of the reluctors T1, T2 is detected), and when the magnetic pole 3a ends the facing (when the trailing edge in the rotational direction of each of the reluctors T1, T2 is detected).

In the description below, the leading edge detection pulse generated when the sensor 3 detects the leading edge of each of the reluctors T1, T2 is Vtf, and the trailing edge detection pulse generated when the sensor 3 detects the trailing edge of each of the reluctors T1, T2 is Vtr.

The second sensor 4 is comprised similarly to the first sensor 3, and is placed with a magnetic pole 4a radially facing the rotor 2 and positioned to face the second series of reluctor P1, and is secured to a sensor mounting portion provided in a securing position on a case or a cover of the engine.

A signal coil in the sensor 4 outputs the leading edge detection pulse and the trailing edge detection pulse having different polarities in response to changes of a magnetic flux caused in the core when the magnetic pole at a tip of the core of the sensor starts facing the leading edge in the rotational direction of the reluctor P1 (when the leading edge in the rotational direction of the reluctor P1 is detected), and when the magnetic pole ends the facing (when the trailing edge in the rotational direction of the reluctor P1 is detected).

In the description below, the leading edge detection pulse generated when the sensor 4 detects the leading edge of the reluctor P1 is Vpf, and the trailing edge detection pulse generated when the sensor 4 detects the trailing edges of the reluctor P1 is Vpr.

In the shown example, the polar arc angle a of the reluctors T1, T2 and the polar arc angle β of the reluctor P1 are set equal ($\alpha=\beta=24°$), and the first series of reluctors T1, T2 are provided at a 180° interval (symmetrically). The second series of reluctor P1 is placed 90° apart forward in the rotational direction in the forward rotation of the engine relative to the first series of reluctor T1.

In this example, winding directions of the signal coils of the both sensors are set so that negative leading edge detection pulses Vtf and Vpf are output when the first sensor 3 and the second sensor 4 detect the leading edges in the rotational direction of the reluctors T1, T2, P1, and positive trailing edge detection pulses Vtr and Vpr are output when the first sensor 3 and the second sensor 4 detect the trailing edges in the rotational direction of the reluctors T1, P1.

FIG. 2A shows waveforms of the leading edge detection pulse Vtf and the trailing edge detection pulse Vtr output by the first sensor 3 in FIG. 1 in the forward rotation of the engine, and FIG. 2B shows waveforms of the leading edge detection pulse Vpf and the trailing edge detection pulse Vpr output by the second sensor 4 in the forward rotation of the engine. FIG. 3A shows waveforms of the leading edge detection pulse Vtf and the trailing edge detection pulse Vtr output by the first sensor 3 in the reverse rotation of the engine, and FIG. 3B shows waveforms of the leading edge detection pulse Vpf and the trailing edge detection pulse Vpr output by the second sensor 4 in the reverse rotation of the engine.

In FIGS. 2A and 3A, reference numerals #1 and #2 denote that reference characters with these reference numerals relate to the first cylinder and the second cylinder of the engine. Reference character BTDC denotes a position before the top dead center of the engine, and reference character ATDC denotes a position after the top dead center of the engine. For example, #1ATDC12° means a crank angle position of 12° after the top dead center of the first cylinder, and #2BTDC12° means a crank angle position of 12° before the top dead center of the second cylinder.

In FIGS. 3A and 3B, a direction of a time axis (horizontal axis) is different from that in FIGS. 2A and 2B.

A T signal in FIGS. 2A and 3A is a pulse generated when the first sensor 3 detects the first series of reluctors, and a P signal in FIGS. 2B and 3B is a pulse generated when the second sensor 4 detects the second series of reluctor.

In the signal generator according to this embodiment, a positional relationship between the first sensor 3 and the second sensor 4 are set so that, as shown in FIGS. 2A and 2B, the second sensor 4 detects the trailing edge of the reluctor P1 to generate the trailing edge detection pulse Vpr between when the first sensor 3 detects the reluctor T1 corresponding to the first cylinder of the engine to generate the leading edge detection pulse Vtf and when the first sensor 3 generates the trailing edge detection pulse Vtr (in the shown example, when the rotational angle position of the crankshaft corresponds to the top dead center position of the first cylinder) in the forward rotation of the engine, and so that, as shown in FIGS. 3A and 3B, the second sensor 4 detects the leading edge of the reluctor P1 to generate the leading edge detection pulse Vpf between when the first sensor 3 detects the reluctor T1 corresponding to the first cylinder to generate the leading edge detection pulse Vtf and when the first sensor 3 generates the trailing edge detection pulse Vtr (in the shown example, when the rotational angle position of the crankshaft corresponds to the top dead center position of the first cylinder) in the reverse rotation of the engine.

Further in this embodiment, the rotor yoke 201 also serves as a yoke of a rotor of a magneto mounted to the engine, and a permanent magnet (not shown) is mounted to an inner periphery of the peripheral wall of the rotor yoke 201. A magnetic rotor is comprised of the rotor yoke 201 and the permanent magnet, and the magneto is comprised of the magnetic rotor and a stator (not shown) placed inside the magnetic rotor and secured to the case of the engine or the like. The magneto is used for supplying power to various electrical components built in various vehicles, and also used as a power supply of a constant voltage direct current power supply circuit for supplying power to a controller that controls the ignition timing or the like of the internal combustion engine.

As described above, comprising so that the second sensor 4 outputs either of the leading edge detection pulse or the trailing edge detection pulse while the first sensor 3 generates the leading edge detection pulse Vtf and the trailing edge detection pulse Vtr causes a change in the phase relationship between the output pulse of the first sensor and the output pulse of the second sensor, when the rotational direction of the engine is reversed. In the example in FIG. 2, the pulses Vpf, Vtf, Vpr, Vtr, Vtf, Vtr are generated in this order in the forward rotation of the engine, and the pulses Vtf, Vpf, Vtr, Vpr, Vtf, Vtr are generated in this order in the reverse rotation of the engine.

The change in the phase relationship between the output pulse of the first sensor and the output pulse of the second sensor caused by the reversal of the rotational direction of the engine occurs as the change in the generation order of the pulses, and also occurs as a change in polarity of the pulses generated by the second sensor 4 between when the first sensor 3 detects one reluctor to generate the leading edge detection pulse and when the first sensor 3 generates the trailing edge detection pulse.

For example, in the example in FIGS. 2 and 3, the second sensor 4 generates the positive trailing edge detection pulse Vpr between when the first sensor 3 detects the leading edge of the reluctor corresponding to the first cylinder to generate the leading edge detection pulse Vtf and when the first sensor 3 detects the trailing edge of the same reluctor to generate the trailing edge detection pulse Vtr in the forward rotation of the engine, but the second sensor 4 generates the negative leading edge detection pulse Vpf between when the first sensor 3 detects the leading edge of the reluctor corresponding to the first cylinder to generate the leading edge detection pulse Vtf and when the first sensor 3 detects the trailing edge of the same reluctor to generate the trailing edge detection pulse Vtr in the reverse rotation of the engine.

Thus, in the signal generator according to the invention, the reversal of the rotational direction of the engine causes the change in the phase relationship between the output pulse of the first sensor and the output pulse of the second sensor. The change in the phase relationship occurs as the changes in various events that can be detected, therefore, inputting the output pulse of the signal generator to the microprocessor to detect the changes in the events provides the information on the rotational direction of the engine and the cylinder discrimination information.

For example, the forward rotation of the engine may be determined when the second sensor 4 generates the trailing edge detection pulse Vpr between when the first sensor 3 generates the leading edge detection pulse Vtf and when the first sensor 3 generates the trailing edge detection pulse Vtr, and the reverse rotation of the engine may be determined when the second sensor 4 generates the leading edge detection pulse Vpf between when the first sensor 3 generates the leading edge detection pulse Vtf and when the first sensor 3 generates the trailing edge detection pulse Vtr.

In both the forward rotation and the reverse rotation, the second sensor 4 generates one pulse while the first sensor 3 detects the first series of reluctor T1 corresponding to the first cylinder of the engine to generate the leading edge detection pulse Vtf and the trailing edge detection pulse Vtr, but the second sensor 4 generates no pulse while the first sensor 3 detects the first series of reluctor T2 corresponding to the second cylinder of the engine to generate the leading edge detection pulse Vtf and the trailing edge detection pulse Vtr. Thus, when it is detected that the second sensor 4 generates one pulse between when the first sensor 3 generates the leading edge detection pulse Vtf and when the first sensor 3 generates the trailing edge detection pulse Vtr, the cylinder corresponding to the pulses Vtf and Vtr (the first cylinder in this example) may be discriminated.

Specifically, the cylinder discrimination means may be comprised so as to discriminate that, when the second sensor 4 generates the leading edge detection pulse or the trailing edge detection pulse while the first sensor 3 sequentially detects the leading edge and the trailing edge of one of the first series of two reluctors to generate the leading edge detection pulse and the trailing edge detection pulse, the leading edge detection pulse and the trailing edge detection pulse generated when the first sensor detects the leading edge and the trailing edge of one of the first series of reluctors correspond to one cylinder of the internal combustion engine, and discriminate that, when the second sensor generates no pulse while the first sensor sequentially detects the leading edge and the trailing edge of the other of the first series of reluctors to sequentially generate the leading edge detection pulse and the trailing edge detection pulse, the leading edge detection pulse and the trailing edge detection pulse generated when the first sensor detects the leading edge and the trailing edge of the other of the first series of reluctors correspond to the other cylinder of the internal combustion engine. The rotation information detector for the two cylinder internal combustion engine may be comprised of the cylinder discrimination means and the signal generator in FIG. 1.

In the signal generator according to the invention, when the rotational direction of the engine is reversed, the changes in the various events caused by the changes in the phase relationship between the output pulse of the first sensor and the output pulse of the second sensor may be detected by counting the number of pulses or discriminating the polarity of the pulse without measuring the time interval between the pulses, with a timer. Thus, the above described way of obtaining the information on the rotational direction and the cylinder discrimination information allows the precise information on the rotational direction and the precise cylinder discrimination information to be obtained even when the engine runs at extremely low speed at which the rotational speed of the crankshaft widely varies due to the stroke changes of the engine and the time interval between the pulses varies.

The changes in the various events caused by the changes in the phase relationship between the output pulse of the first sensor and the output pulse of the second sensor may be detected by, for example, inputting the pulses generated by the first sensor and the second sensor to the CPU of the microprocessor so that the CPU interrupts a running program when each pulse is input to the CPU and performs a predetermined determination process.

To obtain the information on the rotational direction of the engine and the cylinder discrimination information from the output pulses of the first sensor 3 and the second sensor 4 in FIG. 1, as shown in FIG. 4, the output pulses of the first sensor and the second sensor are input to the CPU 10 via waveform shaping circuits 11 to 14. The waveform shaping circuit 11 converts the negative leading edge detection pulse Vtf output by the first sensor 3 to an interrupt signal Stf with a waveform that may be recognized by the CPU and inputs the signal to an interrupt signal input terminal IN1 of the CPU. The waveform shaping circuit 12 converts the positive trailing edge detection pulse Vtr output by the first sensor 3 to an interrupt signal Str with a waveform that may be recognized by the CPU and inputs the signal to an interrupt signal input terminal IN2 of the CPU.

The waveform shaping circuit 13 converts the negative leading edge detection pulse Vpf output by the second sensor 4 to an interrupt signal Spf with a waveform that may be recognized by the CPU 10 and inputs the signal to an interrupt signal input terminal IN3 of the CPU 10. The waveform shaping circuit 14 converts the positive trailing edge detection pulse Vpr output by the second sensor 4 to an interrupt signal Spr with a waveform that may be recognized by the CPU 10 and inputs the signal to an interrupt signal input terminal IN4 of the CPU 10.

The CPU 10 interrupts the running program for each input of the interrupt signal to each signal input terminal to perform processings such as discriminating the polarity of the pulse signal generated by the second sensor 4 between when the first sensor 3 outputs the signal Vtf and when the first sensor 3 generates the signal Vtr, thereby comprising the rotational direction discrimination means for discriminating the rotational direction of the internal combustion engine based on the phase relationship between the leading edge detection pulse and the trailing edge detection pulse generated by the first sensor and the leading edge detection pulse and the trailing edge detection pulse generated by the second sensor; and the cylinder discrimination means for discriminating that, when the second sensor generates the leading edge detection pulse or the trailing edge detection pulse while the first sensor of the signal generator sequentially detects the leading edge and the trailing edge of one of the first series of two reluctors to generate the leading edge detection pulse and the trailing edge detection pulse, the leading edge detection pulse and the trailing edge detection pulse generated when the first sensor detects the leading edge and the trailing edge of one of the first series of reluctors correspond to one cylinder of the internal combustion engine, and for discriminating that, when the second sensor generates no pulse while the first sensor sequentially detects the leading edge and the trailing edge of the other of the first series of reluctors to sequentially generate the leading edge detection pulse and the trailing edge detection pulse, the leading edge detection pulse and the trailing edge detection pulse generated when the first sensor detects the leading edge and the trailing edge of the other of the first series of reluctors correspond to the other cylinder of the internal combustion engine.

It is sufficient to discriminate the rotational direction of the engine and the cylinder once for each start of the forward rotation and for each start of the reverse rotation of the engine, and constant discrimination is not required.

FIGS. 18 to 21 are flowcharts of an example of an algorithm for a program executed by the CPU to achieve the rotational direction discrimination means and the cylinder discrimination means.

Figure 20:
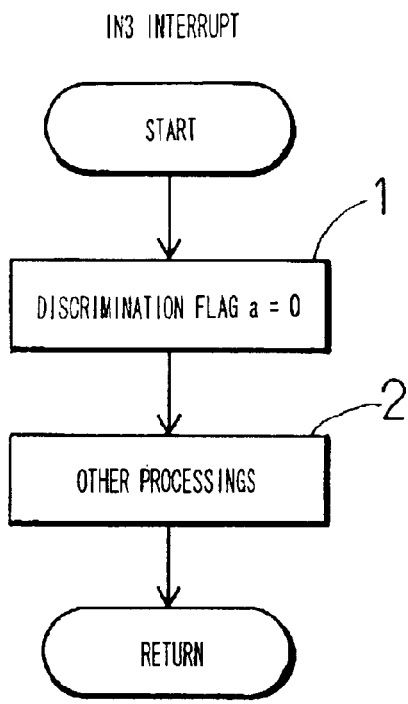
FIG. 20 is a flowchart of a further interrupt routine algorithm for the program executed by the CPU in the first and the second embodiments of the invention.
Figure 21:
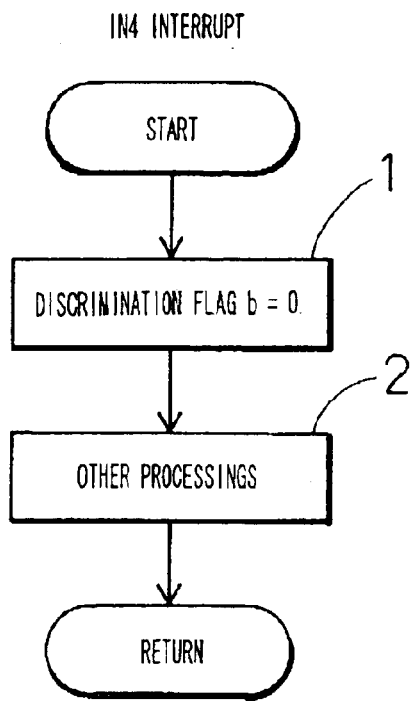
FIG. 21 is a flowchart of a further interrupt routine algorithm for the program executed by the CPU in the first and the second embodiments of the invention.

According to the algorithm in FIGS. 18 to 21, when the first sensor 3 generates the leading edge detection pulse Vtf to input the interrupt signal Stf to the interrupt signal input terminal IN1, a main routine is interrupted to execute an IN1 interrupt in FIG. 18, and when the first sensor 3 generates the trailing edge detection pulse to input the interrupt signal Str to the interrupt signal input terminal IN2, an IN2 interrupt in FIG. 19 is executed. When the second sensor 4 generates the leading edge detection pulse Vpf to input the interrupt signal Spf to the interrupt signal input terminal IN3, an IN3 interrupt in FIG. 20 is executed, and when the second sensor 4 generates the trailing edge detection pulse Vpr to input the interrupt signal Spr to the interrupt signal input terminal IN4, an IN4 interrupt in FIG. 21 is executed.

In the IN1 interrupt in FIG. 18, discrimination flags a and b are first set to "1" in Step 1, then it is determined whether this interrupt is the first IN1 interrupt in Step 2. When determined as the first IN1 interrupt, the process goes to Step 3 to set "first passage flag", and then returns to the main routine. When not determined as the first IN1 interrupt (when the first passage flag is not set) in Step 2, the process goes to Step 4 to perform other necessary processings, and then returns to the main routine. The "other processings" include, for example, reading counts of a timer that counts clock pulses for measuring the rotational speed of the engine.

In the IN3 interrupt in FIG. 20, the discrimination flag a is set to "0" (the flag is reset) in Step 1, and other necessary processings are performed in Step 2, and then returns to the main routine.

In the IN4 interrupt in FIG. 21, the discrimination flag b is set to "0" in Step 1, and other necessary processings are performed, and then returns to the main routine.

In the IN2 interrupt in FIG. 19, it is determined whether the first IN1 interrupt has been executed in Step 1 (whether the first passage flag is set). When it is not determined that the first IN1 interrupt has been executed (when the first passage flag is not set), no processing is performed to return to the main routine. When it is determined that the first IN1 interrupt has been executed in Step 1 (when it is determined that the first passage flag is set), the process goes to Step 2 to determine whether the discrimination flag a is 1. When the discrimination flag a is 1, the process goes to Step 3 to determine whether the discrimination flag b is 1. When it is determined that the discrimination flag b is 1, information that the leading edge detection pulse and the trailing edge detection pulse now generated by the first sensor correspond to the second cylinder is stored in Step 4, and a processing for storing information that the cylinder discrimination has completed (for example, a processing for setting a flag showing that the cylinder discrimination has completed) is performed in Step 5. Then, other necessary processings (processings other than a rotational direction discrimination processing and a cylinder discrimination processing) are performed in Step 6, and then returns to the main routine.

When it is determined that the discrimination flag b is 0 in Step 3 of the IN2 interrupt in FIG. 19, the process goes to Step 7 to store information that the pulses Vtf and Vtr now generated by the first sensor 3 correspond to the first cylinder, and to store information that the rotational direction of the engine is forward in Step 8. Then, a processing for storing information that the rotational direction detection has completed (for example, a processing for setting a flag showing that the rotational direction detection has completed) is performed in Step 9. Then, the process goes to Step 5 to perform a processing for storing information that the cylinder discrimination has completed.

When it is determined that the discrimination flag a is 0 in Step 2, the process goes to Step 10 to determine whether the discrimination flab b is 1. When it is determined that the discrimination flag b is 1, the process goes to Step 11 to store information that the pulses Vtf and Vtr now generated by the first sensor correspond to the first cylinder, and to store information that the rotational direction of the engine is reverse in Step 12. Then, the process goes to Step 9 to perform the processing for storing the information that the rotational direction detection has completed.

Figures 22, 23:
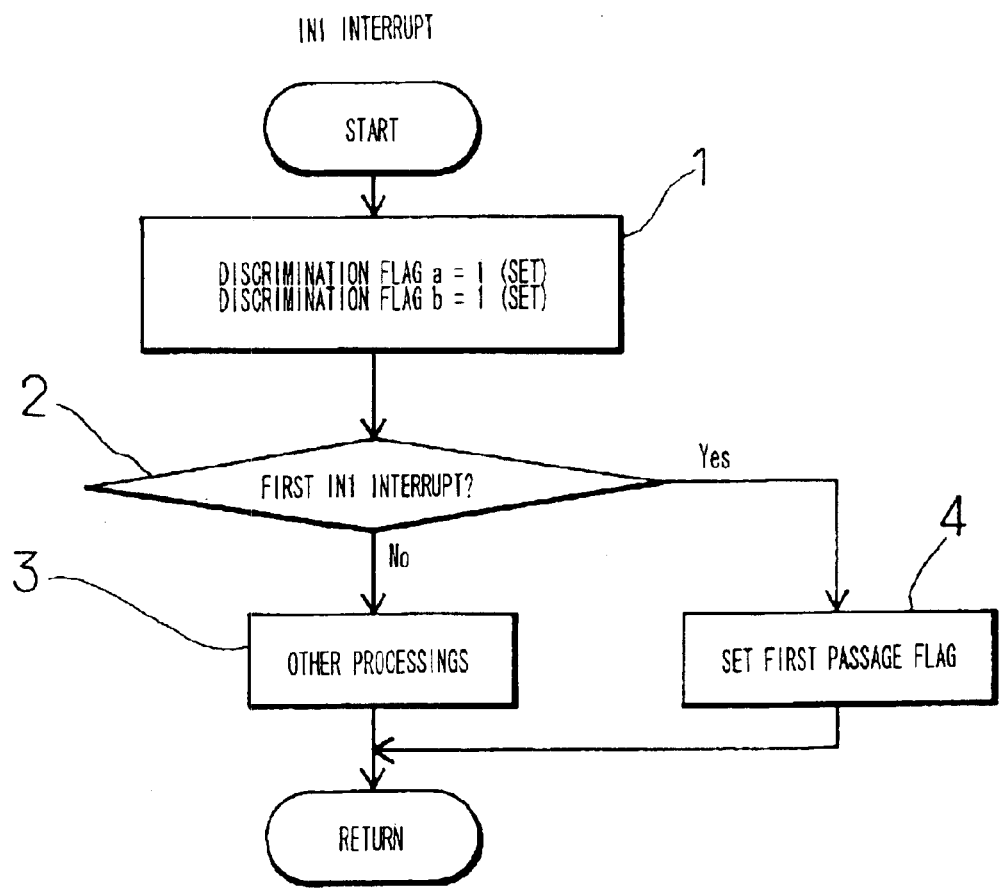
FIG. 22 is a table showing relationships between discrimination flags used in the program in FIGS. 18 to 21 and discrimination results.
FIG. 23 is a flowchart of an interrupt routine algorithm for a program executed by the CPU in the third embodiment of the invention.

FIG. 22 is a table showing relationships between the discrimination flags a and b used in the program in FIGS. 18 to 21 and discrimination results. In this example, in the IN2 interrupt executed when the first sensor 3 generates the trailing edge detection pulse, it is determined that when the discrimination flags a and b are 0 and 1, respectively, the rotational direction of the engine is reverse, and the pulses now generated by the first sensor correspond to the first cylinder, and it is determined that when the discrimination flags a and b are 1 and 0, respectively, the rotational direction of the engine is forward, and the pulses now generated by the first sensor correspond to the first cylinder. When the discrimination flags a and b are both 1, it is determined that the pulses now generated by the first sensor correspond to the second cylinder. When the discrimination flags a and b are both 0 (when determined as b=0 in Step 10 in FIG. 19), it is regarded as abnormal and no discrimination is performed.

According to the algorithm in FIGS. 18 to 21, the rotational direction discrimination means is comprised of Steps 1 and 2 of the IN1 interrupt in FIG. 18, Step 1 of the IN3 interrupt in FIG. 20, Step 1 of the IN4 interrupt in FIG. 21, and Steps 1, 2, 3, 8, 9, 10 and 12 of the IN2 interrupt in FIG. 19.

The cylinder discrimination means is comprised of Steps 1 and 2 of the IN1 interrupt in FIG. 18, Step 1 of the IN3 interrupt in FIG. 20, Step 1 of the IN4 interrupt in FIG. 21, and Steps 1, 2, 3, 4, 5, 7, 10 and 11 of the IN2 interrupt in FIG. 19.

The rotation information detector for detecting the rotation information including the information on the rotational direction of the engine and the cylinder discrimination information is comprised of the signal generator in FIG. 1, the rotational direction discrimination means, and the cylinder discrimination means.

Second Embodiment

In the embodiment in FIG. 1, the second series of one reluctor is provided, but the second series of two or more reluctors may be provided to obtain more rotational angle information of the engine. FIG. 5 shows an example in which a second series of three reluctors P1 to P3 are provided when the invention is applied to a two cylinder internal combustion engine like the example in FIG. 1. In the example in FIG. 5, the second series of third reluctor P3 is provided 48° apart forward in the rotational direction in the forward rotation of the engine relative to the second series of first reluctor P1, and the second series of second reluctor P2 is provided symmetrically to the third reluctor P3. A polar arc angle a of the first series of each reluctor and a polar arc angle P of the second series of each reluctor are both set to 24°.

FIGS. 6A and 6B show waveforms of pulses generated by a first sensor 3 and a second sensor 4 of a signal generator 1 in FIG. 5 in the forward rotation of the engine, and FIGS. 7A and 7B show waveforms of pulses generated by the sensors in the reverse rotation of the engine. As is clear from the waveform views, in the signal generator in FIG. 5, like the signal generator in FIG. 1, the second sensor 4 generates a positive trailing edge detection pulse Vpr between when the first sensor 3 detects the first series of reluctor T1 to generate a leading edge detection pulse Vtf and when the first sensor 3 generates a trailing edge detection pulse Vtr in the forward rotation of the internal combustion engine. In the reverse rotation of the internal combustion engine, the second sensor 4 generates a negative leading edge detection pulse Vpf between when the first sensor 3 detects the reluctor T1 to generate the leading edge detection pulse Vtf and when the first sensor 3 generates the trailing edge detection pulse Vtr.

Thus, these pulses may be used to obtain the information on the rotational direction of the engine, and to discriminate a cylinder corresponding to each pulse generated when the first sensor 3 detects the first series of reluctor.

In the signal generator in FIG. 5, the second sensor 4 detects the leading edge of the third reluctor P3 to generate the leading edge detection pulse Vpf in a 72° advanced position relative to a top dead center position #1TDC in the forward rotation of the engine. The generation position of the pulse Vpf is suitable for use as a reference position for starting measurement of ignition timing of a first cylinder in the forward rotation of the engine. The second sensor 4 detects the leading edge of the second reluctor P2 to generate the pulse Vpf in a 72° advanced position relative to a top dead center position #2TDC in the forward rotation of the engine. The generation position of the pulse Vpf is suitable for use as a reference position for starting measurement of ignition timing of the second cylinder in the forward rotation of the engine.

In the signal generator in FIG. 5, the second sensor 4 detects a trailing edge of the second reluctor P2 to generate the trailing edge detection pulse Vpr in an advanced position relative to the top dead center position #1TDC of the first cylinder in the reverse rotation of the engine. The generation position of the pulse Vpr may be used as a reference position for starting measurement of ignition timing of the first cylinder in the reverse rotation of the engine. The second sensor 4 detects a trailing edge of the third reluctor P3 to generate the pulse Vpr in an advanced position relative to the top dead center position #2TDC of the second cylinder in the reverse rotation of the engine. The generation position of the pulse Vpr may be used as a position for starting measurement of ignition timing of the second cylinder in the reverse rotation of the engine.

Thus, according to the invention, in addition to the reluctor P1 used for discriminating the rotational direction of the engine and the cylinder, further reluctors (P2 and P3 in the example in FIG. 5) may be provided in suitable positions as the second series of reluctors, thus obtaining crank angle information required for controlling the ignition timing of the engine.

In the second embodiment, an algorithm for a program executed by a CPU to comprise rotational direction discrimination means and cylinder discrimination means are the same as in FIGS. 18 to 21.

Third Embodiment

In this embodiment, the invention is applied to a three cylinder internal combustion engine having first to third cylinders.

The signal generator used in this case comprises: a rotor in the form of an inductor having a first series of three reluctors that are placed at 120° intervals in a rotational direction of a crankshaft of the internal combustion engine correspondingly to three cylinders of the internal combustion engine and are rotated together with the crankshaft around a central axis of the crankshaft, and a second series of two reluctors that are provided in a position shifted axially along the crankshaft relative to the first series of reluctors and are rotated together with the first series of reluctors; a first sensor that detects a leading edge and a trailing edge in a rotational direction of each of the first series of three reluctors of the rotor to generate a leading edge detection pulse and a trailing edge detection pulse having different polarities; and a second sensor that detects a leading edge and a trailing edge in a rotational direction of each of the second series of two reluctors of the rotor to generate a leading edge detection pulse and a trailing edge detection pulse having different polarities.

Polar arc angles of the first and the second series of reluctors, a positional relationship between the first and the second sensors, and a positional relationship between the first and the second series of reluctors are set so that the second sensor detects the leading edge or the trailing edge of the second series of one reluctor to generate the leading edge detection pulse or the trailing edge detection pulse while the first sensor sequentially detects the leading edge and the trailing edge of one of the first series of three reluctors to generate the leading edge detection pulse and the trailing edge detection pulse, so that the second sensor detects the leading edge and the trailing edge of the second series of another reluctor to generate the leading edge detection pulse or the trailing edge detection pulse while the first sensor sequentially detects the leading edge and the trailing edge of another of the first series of three reluctors to generate the leading edge detection pulse and the trailing edge detection pulse, and so that the second sensor detects no pulse while the first sensor sequentially detects the leading edge and the trailing edge of further one of the first series of three reluctors to generate the leading edge detection pulse and the trailing edge detection pulse.

When the signal generator is used to comprise a rotation information detector for detecting rotation information including information on a rotational direction of the internal combustion engine having the first to the third cylinders, there are further provided: rotational direction discrimination means for discriminating the rotational direction of the internal combustion engine based on a phase relationship between the leading edge detection pulse and the trailing edge detection pulse generated by the first sensor of the signal generator and the leading edge detection pulse and the trailing edge detection pulse generated by the second sensor; and cylinder discrimination means for discriminating that, when the second sensor generates the leading edge detection pulse or the trailing edge detection pulse while the first sensor of the signal generator sequentially detects the leading edge and the trailing edge of one of the first series of three reluctors to generate the leading edge detection pulse and the trailing edge detection pulse, the leading edge detection pulse and the trailing edge detection pulse generated when the first sensor detects the leading edge and the trailing edge of one of the first series of three reluctors correspond to one cylinder of the internal combustion engine, for discriminating that, when the second sensor generates the leading edge detection pulse and the trailing edge detection pulse while the first sensor sequentially detects the leading edge and the trailing edge of another of the first series of three reluctors to generate the leading edge detection pulse and the trailing edge detection pulse, the leading edge detection pulse and the trailing edge detection pulse generated when the first sensor detects the leading edge and the trailing edge of another of the first series of three reluctors correspond to another cylinder of the internal combustion engine, and for discriminating that, when the second sensor generates no pulse while the first sensor sequentially detects the leading edge and the trailing edge of further one of the first series of reluctors to generate the leading edge detection pulse and the trailing edge detection pulse, the leading edge detection pulse and the trailing edge detection pulse generated when the first sensor detects the leading edge and the trailing edge of further one of the first series of three reluctors correspond to a further cylinder of the internal combustion engine.

More Specifically, when the invention is applied to the three cylinder internal combustion engine, as shown in FIG. 8, the first series of first to third reluctors T1 to T3 corresponding to the first to third cylinders of the engine are provided at 120° intervals on an outer periphery of a rotor yoke 201 of the signal generator 1. A polar arc angle a of each reluctor is set to 24°.

The second series of first reluctor P1 is formed between the reluctors T1 and T2, and the second series of second reluctor P2 is formed in a position shifted at $\gamma(=12°)$ backward in the rotational direction in the forward rotation of the engine relative to the first series of second reluctor T2. A polar arc angle $\beta1$ of the second series of first reluctor P1 is set to 12°, and a polar arc angle $\beta2$ of the second reluctor P2 is set to 24°.

In this signal generator, as shown in FIGS. 9 and 10, the polar arc angles of the first and the second series of reluctors, the positional relationship between the first and the second sensors, and the positional relationship between the first and the second series of reluctors are set so that the second sensor 4 detects the leading edge or the trailing edge of the second series of one reluctor (in this example, the second reluctor P2) to generate the leading edge detection pulse Vpf or the trailing edge detection pulse Vpr while the first sensor 3 sequentially detects the leading edge and the trailing edge of one of the first series of reluctors (in this example, the third reluctor T3) to generate the leading edge detection pulse Vtf and the trailing edge detection pulse Vtr, so that the second sensor 4 detects the leading edge and the trailing edge of the second series of another reluctor (in the shown example, the reluctor P1) to generate the leading edge detection pulse Vpf and the trailing edge detection pulse Vpr while the first sensor 3 sequentially detects the leading edge and the trailing edge of another of the first series of three reluctors (In this example, the reluctor T2) to generate the leading edge detection pulse Vtf and the trailing edge detection pulse Vtr, and so that the second sensor 4 generates no pulse while the first sensor 3 sequentially detects the leading edge and the trailing edge of further one of the first series of three reluctors (in the shown example, the reluctor T1) to generate the leading edge detection pulse Vtf and the trailing edge detection pulse Vtr.

When the signal generator is comprised as described above, like the above described embodiments, the rotational direction discrimination means may be comprised so as to discriminate the rotational direction of the internal combustion engine using a feature that a phase relationship between the leading edge detection pulse and the trailing edge detection pulse generated by the first sensor 3 and the leading edge detection pulse and the trailing edge detection pulse generated by the second sensor 4 differs depending on the rotational direction of the crankshaft.

Further, the cylinder discrimination means may be comprised as described below.

Specifically, the cylinder discrimination means may be comprised so as to discriminate that when the second sensor 4 generates the leading edge detection pulse Vpf and the trailing edge detection pulse Vpr while the first sensor 3 of the signal generator 1 sequentially detects the leading edge and the trailing edge of one of the first series of three reluctors T1 to T3 (in the shown example, the reluctor T3) to generate the leading edge detection pulse Vtf and the trailing edge detection pulse Vtr, the leading edge detection pulse and the trailing edge detection pulse generated when the first sensor 3 detects the leading edge and the trailing edge of one of the first series of three reluctors T1 to T3 (in the shown example, the reluctor T3) correspond to one cylinder (in the shown example, the third cylinder) of the internal combustion engine, for discriminating that, when the second sensor 4 generates the leading edge detection pulse and the trailing edge detection pulse while the first sensor 3 sequentially detects the leading edge and the trailing edge of another of the first series of three reluctors (in the shown example, the reluctor T2) to generate the leading edge detection pulse Vtf and the trailing edge detection pulse Vtr, the leading edge detection pulse and the trailing edge detection pulse generated when the first sensor 3 detects the leading edge and the trailing edge of another of the first series of three reluctors (in the shown example, the reluctor T2) correspond to another cylinder (in the shown example, the second cylinder) of the internal combustion engine, and for discriminating that, when the second sensor 4 generates no pulse while the first sensor 3 sequentially detects the leading edge and the trailing edge of further one of the first series of three reluctors (in the shown example, the reluctor T1) to generate the leading edge detection pulse and the trailing edge detection pulse, the leading edge detection pulse and the trailing edge detection pulse generated when the first sensor 3 detects the leading edge and the trailing edge of further one of the first series of three reluctors (in the shown example, the reluctor T1) correspond to a further cylinder (in the shown example, the first cylinder) of the internal combustion engine.

FIGS. 23 to 26 are flowcharts of an algorithm for a program executed by the CPU to comprise the rotational direction discrimination means and the cylinder discrimination means.

Figure 24:
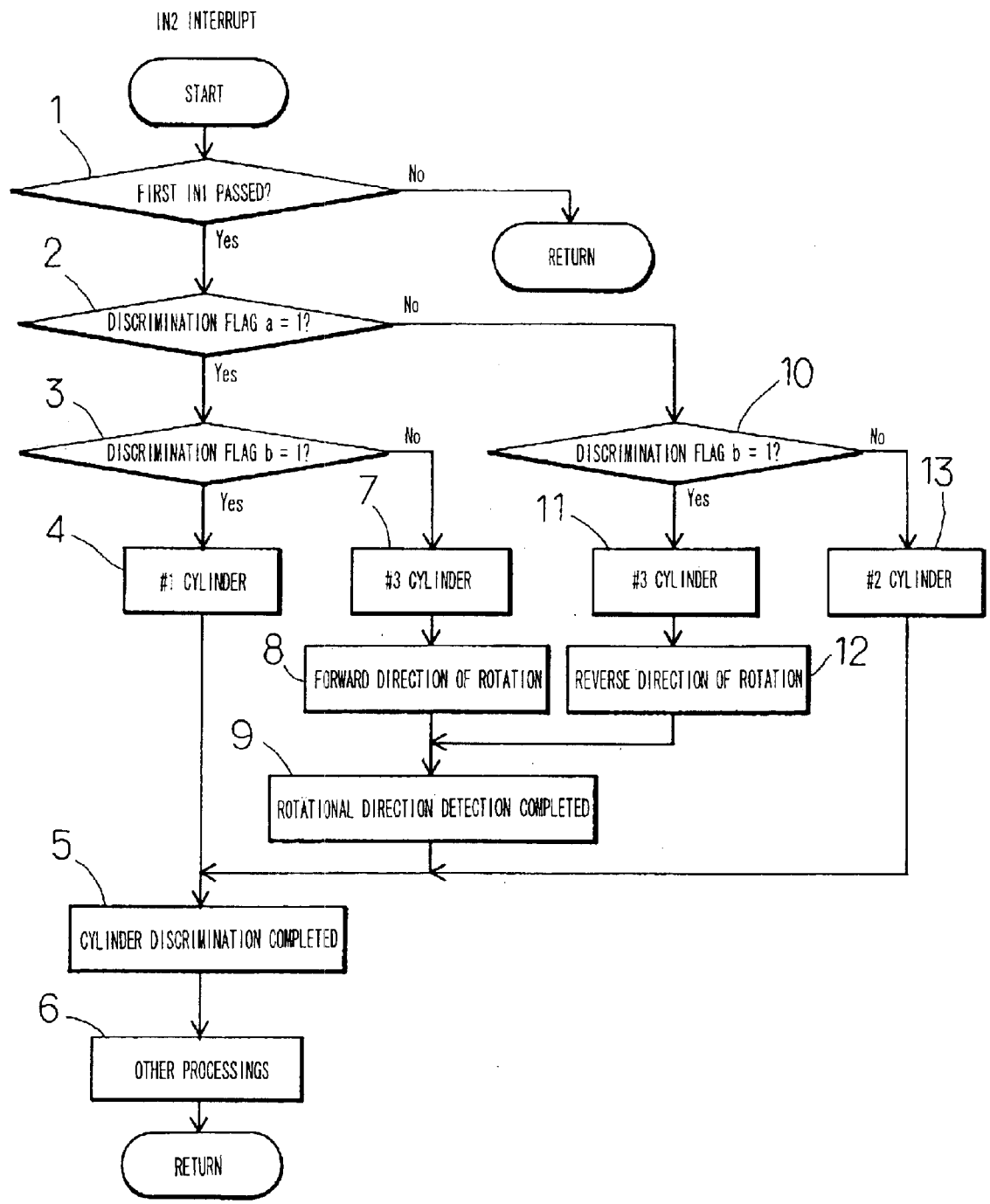
FIG. 24 is a flowchart of another interrupt routine algorithm for the program executed by the CPU in the third embodiment of the invention.

According to the algorithm, when the first sensor 3 generates the leading edge detection pulse Vtf to input an interrupt signal Stf to an interrupt signal input terminal IN1, a main routine is interrupted to execute an IN1 interrupt in FIG. 23, and when the first sensor 3 generates the trailing edge detection pulse to input the interrupt signal Str to an interrupt signal input terminal IN2, an IN2 interrupt in FIG. 24 is executed. When the second sensor 4 generates the leading edge detection pulse Vpf to input the interrupt signal Spf to an interrupt signal input terminal IN3, an IN3 interrupt in FIG. 25 is executed, and when the second sensor 4 generates the trailing edge detection pulse Vpr to input the interrupt signal Spr to an interrupt signal input terminal IN4, an IN4 interrupt in FIG. 26 is executed.

In the IN1 interrupt in FIG. 23, discrimination flags a and B are first set to "1" in Step 1, then it is determined whether this interrupt is the first IN1 interrupt in Step 2. When determined as the first IN1 interrupt, the process goes to Step 3 to set "first passage flag", and then returns to the main routine. When not determined as the first IN1 interrupt (when the first passage flag is not set) in Step 2, the process goes to Step 4 to perform other necessary processings, and then returns to the main routine.

Figure 25:
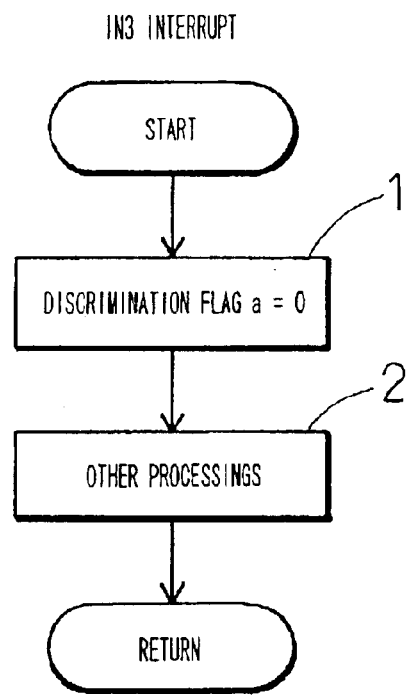
FIG. 25 is a flowchart of a further interrupt routine algorithm for the program executed by the CPU in the third embodiment of the invention.

In the IN3 interrupt in FIG. 25, the discrimination flag a is set to "0" (the flag is reset) in Step 1, and other necessary processings are performed in Step 2, and then returns to the main routine.

Figure 26:
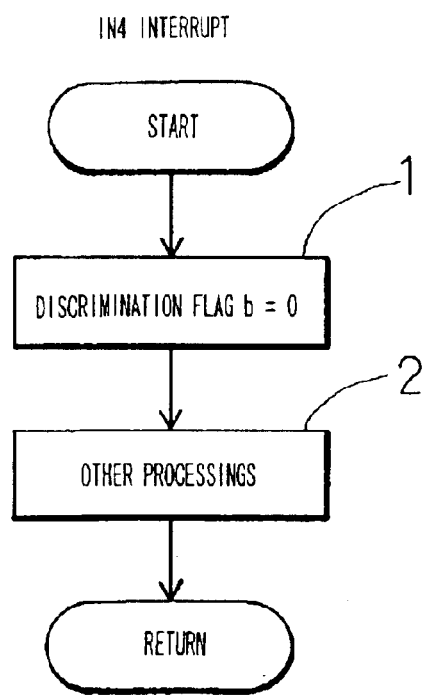
FIG. 26 is a flowchart of a further interrupt routine algorithm for the program executed by the CPU in the third embodiment of the invention.

In the IN4 interrupt in FIG. 26, the discrimination flag b is set to "0" in Step 1, and other necessary processings are performed, then returning to the main routine.

In the IN2 interrupt in FIG. 24, it is determined whether the first IN1 interrupt has been executed in Step 1 (whether the first passage flag is set). When it is not determined that the first IN1 interrupt has been executed (when the first passage flag is not set), no processing is performed to return to the main routine. When it is determined that the first IN1 interrupt has been executed in Step 1 (when it is determined that the first passage flag is set), the process goes to Step 2 to determine whether the discrimination flag a is 1. When the discrimination flag a is 1, the process goes to Step 3 to determine whether the discrimination flag b is 1. When it is determined that the discrimination flag b is 1, a determination result that the leading edge detection pulse and the trailing edge detection pulse now generated by the first sensor correspond to the first cylinder is stored, and a processing for storing information that the cylinder discrimination has completed is performed in Step 5. Then, other necessary processings are performed in Step 6, then returning to the main routine.

When it is determined that the discrimination flag b is 0 in Step 3 of the IN2 interrupt in FIG. 24, the process goes to Step 7 to store a determination result that the pulses Vtf and Vtr now generated by the first sensor 3 correspond to the third cylinder, and to store a determination result that the rotational direction of the engine is forward in Step 8. Then, a processing for storing information that the rotational direction detection has completed is performed in Step 9. Then, the process goes to Step 5 to perform a processing for storing information that the cylinder discrimination has completed.

When it is determined that the discrimination flag a is 0 in Step 2, the process goes to Step 10 to determine whether the determination flab b is 1. When it is determined that the discrimination flag b is 1, the process goes to Step 11 to store a determination result that the pulses Vtf and Vtr now generated by the first sensor correspond to the third cylinder, and to store a determination result that the rotational direction of the engine is reverse in Step 12. Then, the process goes to Step 9 to complete the rotational direction detection.

When it is determined that the discrimination flag b is 0 in Step 10, the process goes to Step 13 to store a determination result that the pulses Vtf and Vtr now generated by the first sensor correspond to the second cylinder. Then, the process goes to Step 5 to complete the cylinder discrimination.

FIG. 27 is a table showing relationships between the discrimination flags a and b used in the program in FIGS. 23 to 26 and discrimination results. In this example, in the IN2 interrupt executed when the first sensor 3 generates the trailing edge detection pulse, it is determined that when the discrimination flags a and b are 0 and 1, respectively, the rotational direction of the engine is reverse, and the pulses now generated by the first sensor correspond to the third cylinder, and it is determined that when the discrimination flags a and b are 1 and 0, respectively, the rotational direction of the engine is forward, and the pulses now generated by the first sensor correspond to the third cylinder. When the discrimination flags a and b are both 1, it is determined that the pulses now generated by the first sensor correspond to the first cylinder. When the discrimination flags a and b are both 0, it is determined that the pulses now generated by the first sensor correspond to the second cylinder.

According to the algorithm in FIGS. 23 to 26, the rotational direction discrimination means is comprised of Steps 1 and 2 of the IN1 interrupt in FIG. 23, Step 1 of the IN3 interrupt in FIG. 25, Step 1 of the IN4 interrupt in FIG. 26, and Steps 1, 2, 3, 8, 9, 10 and 12 of the IN2 interrupt in FIG. 24.

The cylinder discrimination means is comprised of Steps 1 and 2 of the IN1 interrupt in FIG. 23, Step 1 of the IN3 interrupt in FIG. 25, Step 1 of the IN4 interrupt in FIG. 26, and Steps 1, 2, 3, 4, 5, 7, 10 and 11 of the IN2 interrupt in FIG. 24.

The rotation information detector for detecting the rotation information including the information on the rotational direction of the engine and the cylinder discrimination information is comprised of the signal generator in FIG. 8, the rotational direction discrimination means, and the cylinder discrimination means.

Fourth Embodiment

In the above described embodiments, four pulses: the leading edge detection pulse Vtf and the trailing edge detection pulse Vtr output by the first sensor 3, and the leading edge detection pulse Vpf and the trailing edge detection pulse Vpt output by the second sensor 4, are input to the CPU to discriminate the rotational direction or discriminate the cylinder corresponding to the pulse generated when the first sensor detects the first series of reluctor. However, in order to reduce the number of waveform shaping circuits and save CPU ports used for discriminating the rotational direction and the cylinder, only three pulses: the leading edge detection pulse generated by the first sensor 3, and the leading edge detection pulse and the trailing edge detection pulse generated by the second sensor, may be input to the CPU to discriminate the rotational direction and the cylinder.

In this case, the rotational direction discrimination means is comprised so as to discriminate the rotational direction of the internal combustion engine based on a phase relationship between the leading edge detection pulse generated by the first sensor of the signal generator and the leading edge detection pulse and the trailing edge detection pulse generated by the second sensor.

As described above, when the leading edge detection pulse generated by the first sensor and the leading edge detection pulse and the trailing edge detection pulse generated by the second sensor are used to discriminate the rotational direction, as shown in FIG. 11, a waveform shaping circuit 11 converts the leading edge detection pulse Vtf output by the first sensor 3 to a signal Stf that may be recognized by the CPU and inputs the signal to an interrupt signal input terminal IN1 of the CPU 10. Waveform shaping circuits 13 and 14 convert the leading edge detection pulse Vpf and the trailing edge detection pulse Vpr output by the second sensor 4 to signals Spf and Spr with waveforms that may be recognized by the CPU and input the signals to interrupt signal input terminals IN3 and IN4 of the CPU 10.

When the internal combustion engine has the first cylinder and the second cylinder, and the leading edge detection pulse generated by the first sensor, and the leading edge detection pulse and the trailing edge detection pulse generated by the second sensor are used to discriminate the rotational direction, if the signal generator is comprised as shown in FIG. 1, the pulse input to the CPU from the first sensor 3 in the forward rotation of the engine is as shown in FIG. 12A, and a pulse signal input to the CPU from the second sensor 4 in the forward rotation of the engine is as shown in FIG. 12B. The pulse input to the CPU from the first sensor 3 in the reverse rotation of the engine is as shown in FIG. 13A, and a pulse signal input to the CPU from the second sensor 4 in the reverse rotation of the engine is as shown in FIG. 13B.

Also in this case, the rotational direction discrimination means is comprised so as to discriminate the rotational direction of the internal combustion engine based on the phase relationship between the leading edge detection pulse generated by the first sensor 3 and the leading edge detection pulse and the trailing edge detection pulse generated by the second sensor 4.

The cylinder discrimination means is comprised so as to discriminate which cylinder of the internal combustion engine the pulse generated by the first sensor corresponds to, using a feature that a polarity or the number of pulses generated by the second sensor between when the first sensor 3 of the signal generator detects the leading edge of the first series of reluctor corresponding to the first cylinder of the internal combustion engine to generate the leading edge detection pulse and when the first sensor 3 detects the leading edge of the first series of reluctor corresponding to the second cylinder of the internal combustion engine to generate the leading edge detection pulse is different from a polarity or the number of pulses generated by the second sensor between when the first sensor detects the leading edge of the first series of reluctor corresponding to the second cylinder of the internal combustion engine to generate the leading edge detection pulse and when the first sensor detects the leading edge of the first series of reluctor corresponding to the first cylinder of the internal combustion engine to generate the leading edge detection pulse.

Specifically, when the signal generator in FIG. 1 is used, as is clear from FIGS. 12A and 12B and FIGS. 13A and 13B, it may be determined that the engine rotates forward when the second sensor 4 outputs either of the leading edge detection pulse or the trailing edge detection pulse between when the first sensor 3 generates one leading edge detection pulse Vtf and when the first sensor 3 generates a next leading edge detection pulse Vtf, and it may be determined that the engine rotates reversely when the second sensor 4 generates the leading edge detection pulse and the trailing edge detection pulse, or generates no pulse between when the first sensor 3 generates one leading edge detection pulse Vtf and when the first sensor 3 generates the next leading edge detection pulse Vtf.

It may be determined that the engine rotates forward when the second sensor 4 generates the trailing edge detection pulse and the leading edge detection pulse alternately after the first sensor 3 generates the leading edge detection pulse Vtf, and it may be determined that the engine rotates reversely when the second sensor 4 always generates the leading edge detection pulse after the first sensor 3 generates the leading edge detection pulse Vtf.

In the forward rotation of the engine, as shown in FIGS. 12A and 12B, after the first sensor 3 generates the leading edge detection pulse Vtf, and the second sensor 4 generates the leading edge detection pulse Vpf, the first sensor 3 generates the leading edge detection pulse Vtf corresponding to the first cylinder, and after the first sensor 3 generates the leading edge detection pulse Vtf, and the second sensor 4 generates the trailing edge detection pulse Vpr, the first sensor 3 generates the leading edge detection pulse Vtf corresponding to the second cylinder.

In the reverse rotation of the engine, as shown in FIGS. 13A and 13B, after the first sensor 3 generates the leading edge detection pulse Vtf, with the second sensor 4 generating no pulse, the first sensor 3 generates the leading edge detection pulse Vtf corresponding to the first cylinder, and after the first sensor 3 generates the leading edge detection pulse Vtf and the second sensor 4 generates the leading edge detection pulse Vpf and the trailing edge detection pulse Vpr, the first sensor 3 generates the leading edge detection pulse Vtf corresponding to the second cylinder.

Figure 29:
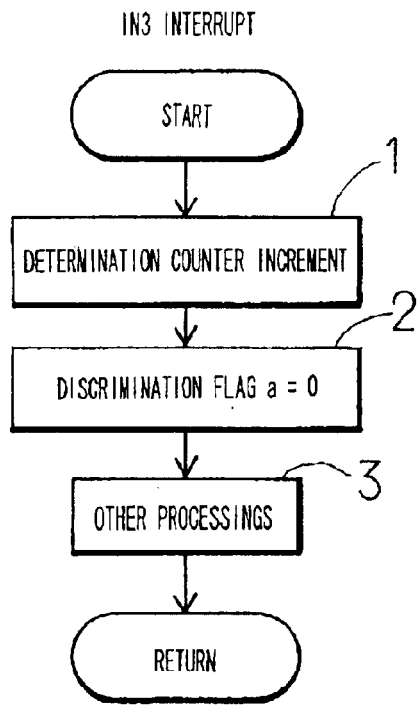
FIG. 29 is a flowchart of another interrupt routine algorithm for the program executed by the CPU in the fourth embodiment of the invention.
Figure 30:
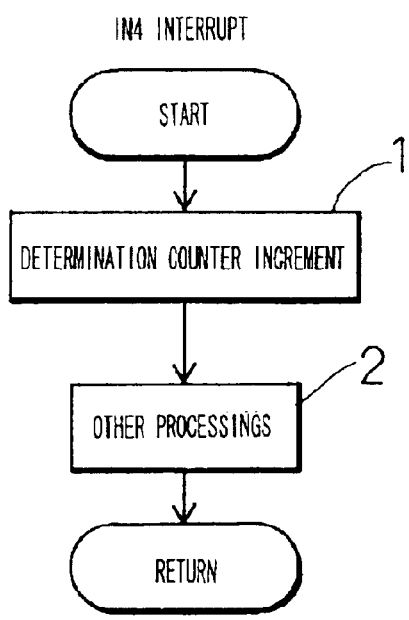
FIG. 30 is a flowchart of a further interrupt routine algorithm for the program executed by the CPU in the fourth embodiment of the invention.

In this embodiment, FIGS. 28 to 30 are flowcharts of an example of an algorithm for a program executed by the CPU to comprise the rotational direction discrimination means and the cylinder discrimination means.

According to the algorithm, when the first sensor 3 generates the leading edge detection pulse Vtf, an IN1 interrupt in FIG. 28 is executed, and when the second sensor 4 generates the leading edge detection pulse Vpf and the trailing edge detection pulse Vpr, an IN3 interrupt in FIG. 29 and an IN4 interrupt in FIG. 30 are executed.

In the IN3 interrupt in FIG. 29, a determination counter is incremented by 1 in Step 1. Then, a discrimination flag a is set to 0 in Step 2, and other necessary processings are performed in Step 3, then returning to a main routine. In the IN4 interrupt in FIG. 30, the determination counter is incremented by 1 in Step 1, and other necessary processings are performed in Step 2, then returning to the main routine.

In the IN1 interrupt in FIG. 28, it is determined whether this IN1 interrupt is the first interrupt in Step 1. When determined as the first interrupt, a first passage flag is set in Step 2, a count of the determination counter is set to 0 in Step 3, and the discrimination flag a is set to 1 in Step 4, returning to the main routine. When not determined as the first IN1 interrupt (when it is not determined that the first passage flag is set) in Step 1, the process goes to Step 5 to determine whether the count of the determination counter is 1. When it is determined that the count of the determination counter is 1, the process goes to Step 6 to store a determination result that the rotational direction of the engine is forward, and a processing for storing information that the rotational direction detection has completed is performed in Step 7. Then, it is determined whether the discrimination flag a is 1 in Step 8, and when the discrimination flag a is 1, a determination result that the pulse now generated by the first sensor 3 corresponds to the second cylinder is stored in Step 9. Then, a processing for storing information that the cylinder discrimination has completed is performed in Step 10, and the count of the determination counter is set to 0 in Step 11. Then, the discrimination flag a is set to 1 in Step 12, and other necessary processings are performed in Step 13, then returning to the main routine. When it is determined that the discrimination flag a is 0 in Step 8, the process goes to Step 14 to store a determination result that the pulse now generated by the first sensor corresponds to the first cylinder. Then, the process goes to Step 10 to complete the cylinder discrimination.

When it is not determined that the count of the determination counter is 1 in Step 5 in FIG. 28, the process goes to Step 15 to store a determination result that the rotational direction of the engine is reverse, and a processing for storing information that the rotational direction detection has completed is performed in Step 16. Then, it is determined whether the discrimination flag a is 1 in Step 17, and when the discrimination flag a is 1, a determination result that the pulse now generated by the first sensor corresponds to the first cylinder is stored in Step 18. Then, the process goes to Step 10 to complete the cylinder discrimination. When it is determined that the discrimination flag a is 0 in Step 17, the determination result that the pulse now generated by the first sensor corresponds to the second cylinder is stored in Step 19. Then, the process goes to Step 10 to complete the cylinder discrimination.

According to the algorithm in FIG. 28 to FIG. 30, the rotational direction discrimination means is comprised of Steps 1, 2, 3, 4, 5, 6, 7, 11, 12, 15 and 16 in FIG. 28, the IN3 interrupt in FIG. 29, and the IN4 interrupt in FIG. 30. The cylinder discrimination means is comprised of Steps 1, 2, 3, 4, 5, 8, 9, 10, 11, 12, 14, 18 and 19, the IN3 interrupt in FIG. 29, and the IN4 interrupt in FIG. 30.

In the above description, three pulses: the leading edge detection pulse generated by the first sensor 3, and the leading edge detection pulse and the trailing edge detection pulse generated by the second sensor 4, are used to discriminate the rotational direction and the cylinder. However, three pulses: the trailing edge detection pulse generated by the first sensor 3, and the leading edge detection pulse and the trailing edge detection pulse generated by the second sensor 4, may be used to discriminate the rotational direction and the cylinder.

In this case, the rotational direction discrimination means is comprised so as to discriminate the rotational direction of the internal combustion engine based on a phase relationship between the trailing edge detection pulse generated by the first sensor and the leading edge detection pulse and the trailing edge detection pulse generated by the second sensor.

The cylinder discrimination means is comprised so as to discriminate which cylinder of the internal combustion engine the pulse generated by the first sensor corresponds to from the polarity or the number of pulses generated by the second sensor between when the first sensor generates one trailing edge detection pulse and when the first sensor generates a next trailing edge detection pulse.

Fifth Embodiment

When the internal combustion engine has the first cylinder and the second cylinder, and uses the signal generator in FIG. 5, as shown in FIG. 11, the leading edge detection pulse generated by the first sensor and the leading edge detection pulse and the trailing edge detection pulse generated by the second sensor may be used to discriminate the rotational direction and the cylinder.

In this case, the pulse input to the CPU from the first sensor 3 in the forward rotation of the engine is as shown in FIG. 14A, and a pulse signal input to the CPU from the second sensor 4 in the forward rotation of the engine is as shown in FIG. 14B. The pulse input to the CPU from the first sensor 3 in the reverse rotation of the engine is as shown in FIG. 15A, and a pulse signal input to the CPU from the second sensor 4 in the reverse rotation of the engine is as shown in FIG. 15B.

In this case, it may be determined that the engine rotates forward when the second sensor 4 generates three pulses (Vpr, Vpf, Vpr, or Vpf, Vpr, Vpf) between when the first sensor 3 generates one leading edge detection pulse Vtf and when the first sensor 3 generates a next leading edge detection pulse Vtf, and it may be determined that the engine rotates reversely when the second sensor 4 generates two or four pulses between when the first sensor 3 generates one leading edge detection pulse Vtf and when the first sensor 3 generates a next leading edge detection pulse Vtf.

In the forward rotation of the engine, after the first sensor 3 generates the leading edge detection pulse Vtf, the second sensor 4 generates the leading edge detection pulse Vpf twice, and the first sensor 3 outputs the leading edge detection pulse Vtf corresponding to the first cylinder, and after the first sensor 3 generates the leading edge detection pulse Vtf, the second sensor 4 generates the trailing edge detection pulse Vpr twice, and the first sensor 3 outputs the leading edge detection pulse Vtf corresponding to the second cylinder.

In the reverse rotation of the engine, after the first sensor 3 generates the leading edge detection pulse Vtf, the second sensor 4 generates one leading edge detection pulse Vpf and one trailing edge detection pulse Vpr (two pulses in total), and the first sensor 3 outputs the leading edge detection pulse Vtf corresponding to the first cylinder, and after the first sensor 3 generates the leading edge detection pulse Vtf, the second sensor 4 generates two leading edge detection pulses Vpf and two trailing edge detection pulses Vpr (four pulses in total), and the first sensor 3 outputs the leading edge detection pulse Vtf corresponding to the second cylinder.

Figure 31:
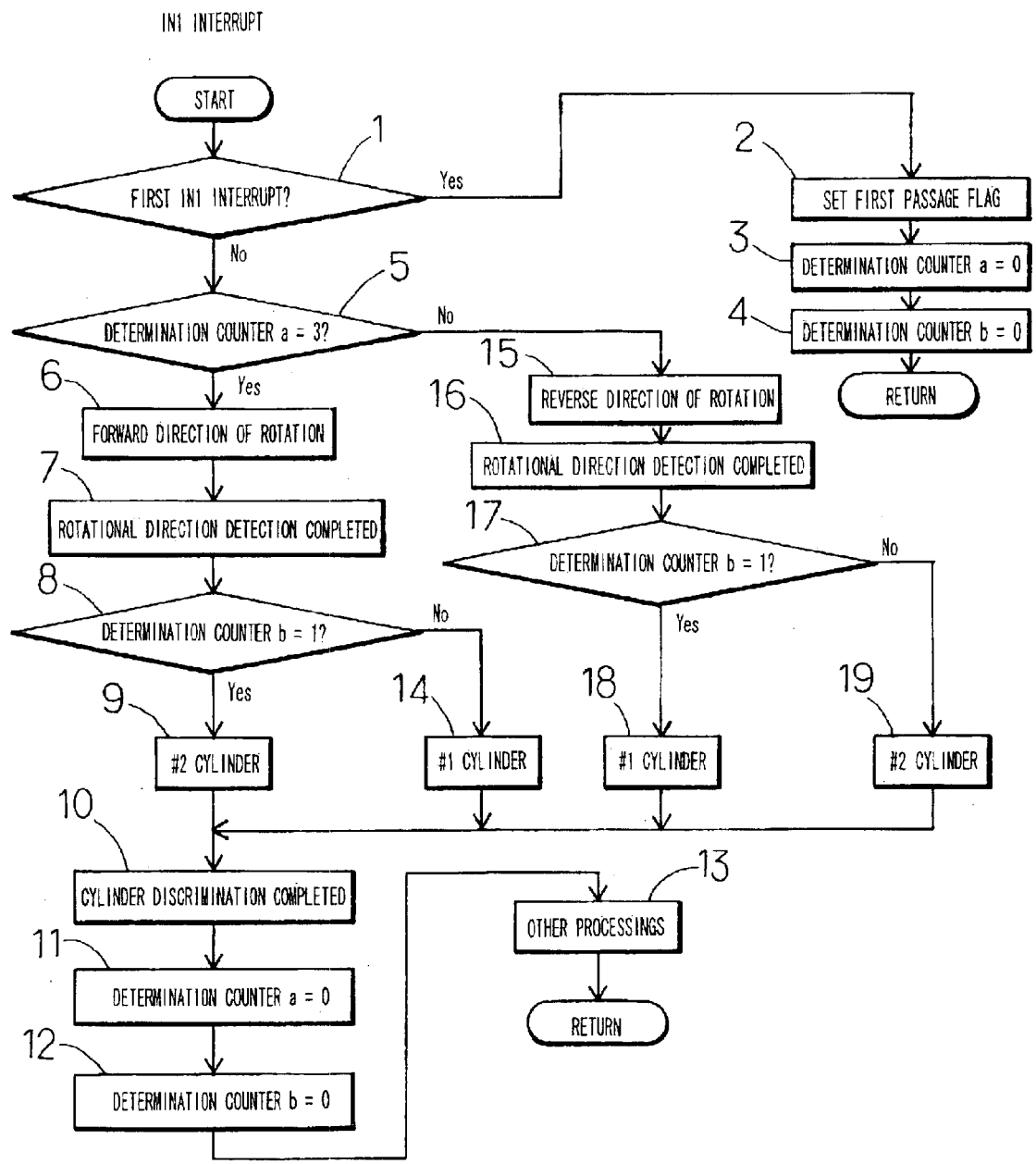
FIG. 31 is a flowchart of an interrupt routine algorithm for a program executed by the CPU in the fifth embodiment of the invention.
Figure 32:
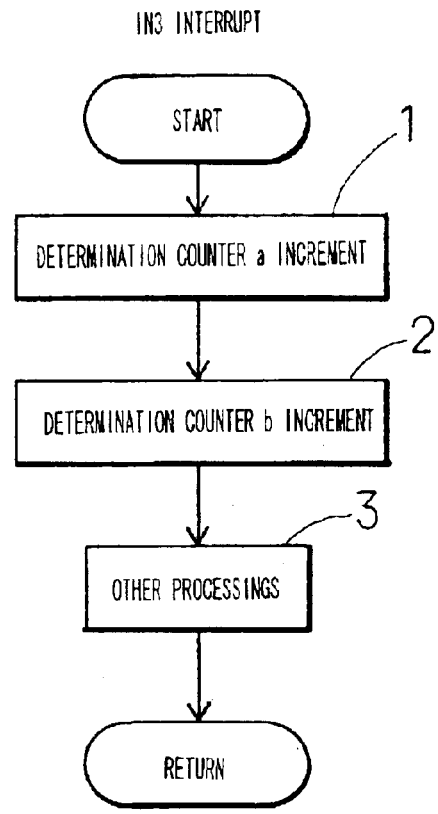
FIG. 32 is a flowchart of another interrupt routine algorithm for the program executed by the CPU in the fifth embodiment of the invention.
Figure 33:
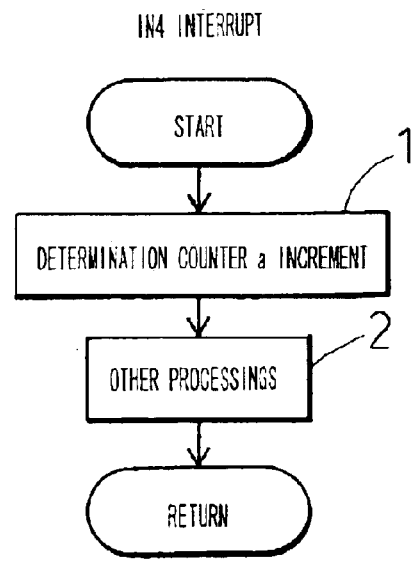
FIG. 33 is a flowchart of a further interrupt routine algorithm for the program executed by the CPU in the fifth embodiment of the invention.

In this embodiment, FIGS. 31 to 33 are flowcharts of an example of an algorithm for a program executed by the CPU to comprise the rotational direction discrimination means and the cylinder discrimination means.

According to the algorithm, when the first sensor 3 generates the leading edge detection pulse Vtf, an IN1 interrupt in FIG. 31 is executed, and when the second sensor 4 generates the leading edge detection pulse Vpf and the trailing edge detection pulse Vpr, an IN3 interrupt in FIG. 32 and an IN4 interrupt in FIG. 33, respectively are executed.

In the IN3 interrupt in FIG. 32, a count of a determination counter a is incremented by 1 in Step 1. Then, a count of a determination counter b is incremented by 1 in Step 2, and other necessary processings are performed in Step 3, then returning to a main routine. In the IN4 interrupt in FIG. 33, the determination counter a is incremented by 1 in Step 1, and other necessary processings are performed in Step 2, then returning to the main routine.

In the IN1 interrupt in FIG. 31, it is determined whether this IN1 interrupt is the first interrupt in Step 1. When determined as the first interrupt, a first passage flag is set in Step 2, the count of the determination counter a is set to 0 in Step 3, and the count of the determination counter b is set to 0 in Step 4, returning to the main routine. When not determined as the first IN1 interrupt (when it is not determined that the first passage flag is set) in Step 1, the process goes to Step 5 to determine whether the count of the determination counter a is 3. When it is determined that the count of the determination counter a is 3, the process goes to Step 6 to store a determination result that the rotational direction of the engine is forward, and a processing for storing information that the rotational direction detection has completed is performed in Step 7. Then, it is determined whether the determination counter b is 1 in Step 8, and when the determination counter b is 1, a determination result that the pulse now generated by the first sensor 3 corresponds to the second cylinder is stored in Step 9. Then, a processing for storing information that the cylinder discrimination has completed is performed in Step 10, and the count of the determination counter a is set to 0 in Step 11. Then, the determination counter b is set to 0 in Step 12, and other necessary processings are performed in Step 13, then returning to the main routine. When it is determined that the determination counter b is 0 in Step 8, the process goes to Step 14 to store a determination result that the pulse now generated by the first sensor corresponds to the first cylinder is stored. Then, the process goes to Step 10 to complete the cylinder discrimination.

When it is not determined that the count of the determination counter a is 3 in Step 5 in FIG. 31, the process goes to Step 15 to store a determination result that the rotational direction of the engine is reverse, and a processing for storing information that the rotational direction detection has completed is performed in Step 16. Then, it is determined whether the count of the determination counter a is 1 in Step 17, and when the count of the determination counter a is 1, a determination result that the pulse now generated by the first sensor corresponds to the first cylinder is stored in Step 18. Then, the process goes to Step 10 to complete the cylinder discrimination. When it is determined that the count of the determination counter a is 0 in Step 17, the determination result that the pulse now generated by the first sensor corresponds to the second cylinder is stored in Step 19. Then, the process goes to Step 10 to complete the cylinder discrimination.

According to the algorithm in FIG. 31 to FIG. 33, the rotational direction discrimination means is comprised of Steps 1, 2, 3, 4, 5, 6, 7, 11, 12, 15 and 16 in FIG. 31, the IN3 interrupt in FIG. 32, and the IN4 interrupt in FIG. 33. The cylinder discrimination means is comprised of Steps 1, 2, 3, 4, 5, 8, 9, 10, 11, 12, 14, 18 and 19, the IN3 interrupt in FIG. 32, and the IN4 interrupt in FIG. 33.

In the above description, three pulses: the leading edge detection pulse generated by the first sensor 3, and the leading edge detection pulse and the trailing edge detection pulse generated by the second sensor 4, are used to discriminate the rotational direction and the cylinder. Also in this embodiment, three pulses: the trailing edge detection pulse generated by the first sensor 3, and the leading edge detection pulse and the trailing edge detection pulse generated by the second sensor 4, may be used to discriminate the rotational direction and the cylinder.

In this case, the rotational direction discrimination means is comprised so as to discriminate the rotational direction of the internal combustion engine based on a phase relationship between the trailing edge detection pulse generated by the first sensor and the leading edge detection pulse and the trailing edge detection pulse generated by the second sensor.

The cylinder discrimination means is comprised so as to discriminate which cylinder of the internal combustion engine the pulse generated by the first sensor corresponds to, using a feature that a polarity or the number of pulses generated by the second sensor between when the first sensor of the signal generator detects the trailing edge of the first series of reluctor corresponding to the first cylinder of the internal combustion engine to generate the trailing edge detection pulse and when the first sensor detects the trailing edge of the first series of reluctor corresponding to the second cylinder of the internal combustion engine to generate the trailing edge detection pulse is different from a polarity or the number of pulses generated by the second sensor between when the first sensor detects the trailing edge of the first series of reluctor corresponding to the second cylinder of the internal combustion engine to generate the trailing edge detection pulse and when the first sensor detects the trailing edge of the first series of reluctor corresponding to the first cylinder of the internal combustion engine to generate the trailing edge detection pulse.

Sixth Embodiment

Further, when the internal combustion engine has the first to the third cylinders, and uses the signal generator in FIG. 8, three pulses may be simply used to discriminate the rotational direction and the cylinder. In this case, the rotational direction discrimination means is comprised so as to discriminate the rotational direction of the internal combustion engine based on a phase relationship between the leading edge detection pulse generated by the first sensor and the leading edge detection pulse and the trailing edge detection pulse generated by the second sensor.

The cylinder discrimination means is comprised so as to discriminate which cylinder of the internal combustion engine the pulse generated by the first sensor corresponds to, using a feature that a polarity or the number of pulses generated by the second sensor between when the first sensor of the signal generator detects the leading edge of the first series of reluctor corresponding to the first cylinder of the internal combustion engine to generate the leading edge detection pulse and when the first sensor detects the leading edge of the first series of reluctor corresponding to the second cylinder of the internal combustion engine to generate the leading edge detection pulse is different from a polarity or the number of pulses generated by the second sensor between when the first sensor detects the leading edge of the first series of reluctor corresponding to the second cylinder of the internal combustion engine to generate the leading edge detection pulse and when the first sensor detects the leading edge of the first series of reluctor corresponding to the third cylinder of the internal combustion engine to generate the leading edge detection pulse, and different from a polarity or the number of pulses generated by the second sensor between when the first sensor detects the leading edge of the first series of reluctor corresponding to the third cylinder of the internal combustion engine to generate the leading edge detection pulse and when the first sensor detects the leading edge of the first series of reluctor corresponding to the first cylinder of the internal combustion engine to generate the leading edge detection pulse.

As shown in FIG. 11, among the pulses generated by the first sensor, the leading edge detection pulse only is used to discriminate the rotational direction and the cylinder. When the signal generator in FIG. 8 is used, the pulses provided to the CPU from the first sensor 3 and the second sensor 4 in the forward rotation of the engine are as shown in FIGS. 16A and 16B, respectively, and the pulses provided to the CPU from the first sensor 3 and the second sensor 4 in the reverse rotation of the engine are as shown in FIGS. 17A and 17B, respectively.

In this case, it may be determined that the engine rotates forward when no pulse generated by the second sensor is detected between when the first sensor generates one leading edge detection pulse and when the first sensor generates a next leading edge detection pulse, and then three pulses generated by the second sensor are detected before the first sensor generates a further next leading edge detection pulse, and it may be determined that the engine rotates reversely when only two or less pulses generated by the second sensor are detected between when the first sensor generates one leading edge detection pulse and when the first sensor generates the next leading edge detection pulse.

In this embodiment, it may be discriminated which cylinder of the internal combustion engine the pulse generated by the first sensor corresponds to, using a feature that the number of pulses generated by the second sensor 4 between when the first sensor 3 detects the leading edge of the first series of reluctor T1 corresponding to the first cylinder of the internal combustion engine to generate the leading edge detection pulse Vtf and when the first sensor 3 detects the leading edge of the first series of reluctor T2 corresponding to the second cylinder of the internal combustion engine to generate the leading edge detection pulse Vtf is different from the number of pulses generated by the second sensor 4 between when the first sensor 3 detects the leading edge of the first series of reluctor T2 corresponding to the second cylinder of the internal combustion engine to generate the leading edge detection pulse and when the first sensor 3 detects the leading edge of the first series of reluctor T3 corresponding to the third cylinder of the internal combustion engine to generate the leading edge detection pulse, and different from the number of pulses generated by the second sensor 4 between when the first sensor 3 detects the leading edge of the first series of reluctor T3 corresponding to the third cylinder of the internal combustion engine to generate the leading edge detection pulse and when the first sensor detects the leading edge of the first series of reluctor T1 corresponding to the first cylinder of the internal combustion engine to generate the leading edge detection pulse.

In this embodiment, FIGS. 34 to 37 are flowcharts of an example of an algorithm for a program executed by the CPU to comprise the rotational direction discrimination means and the cylinder discrimination means.

Figure 34:
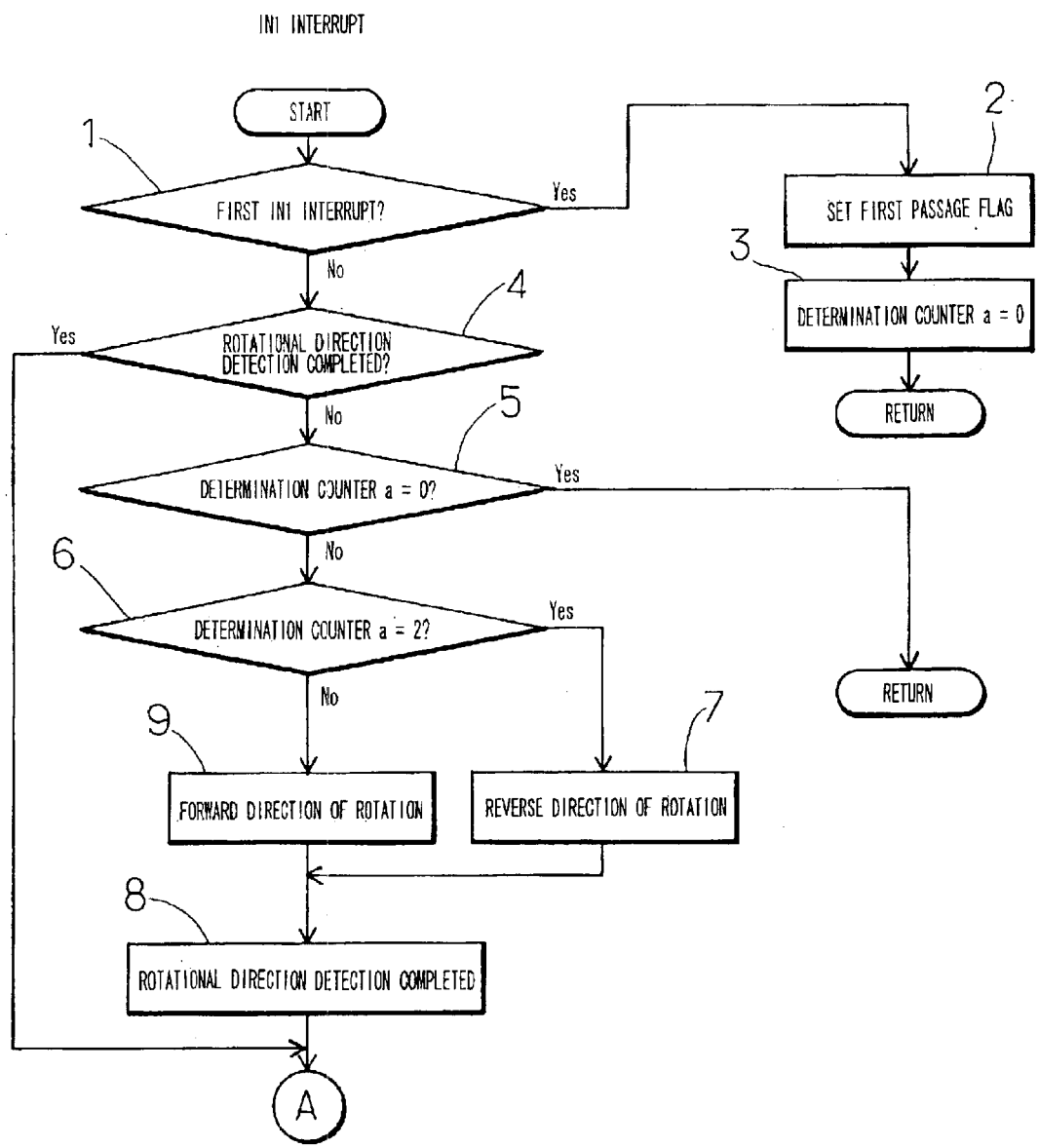
FIG. 34 is a flowchart of part of an interrupt routine algorithm for a program executed by the CPU in a sixth embodiment of the invention.
Figure 35:
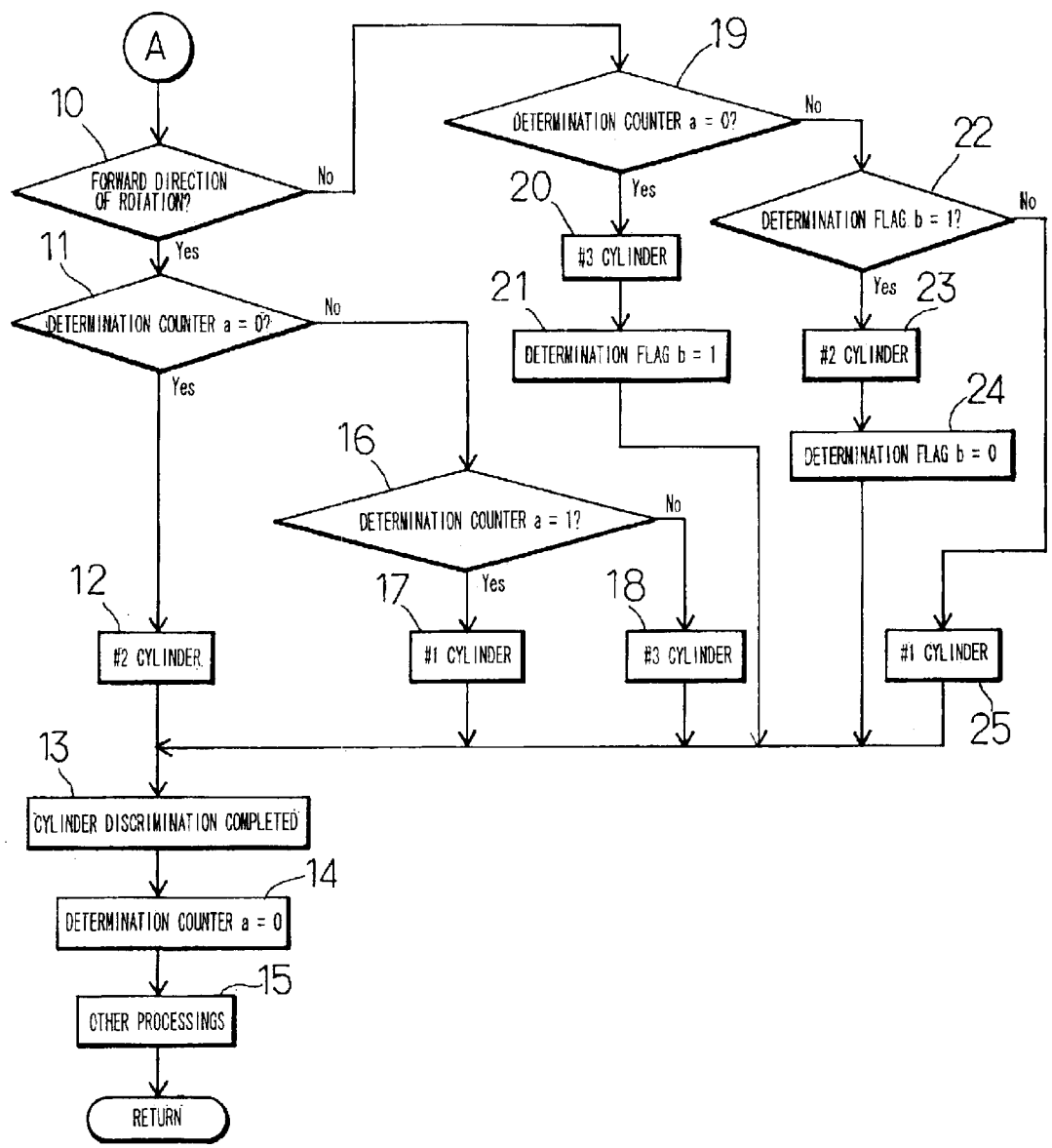
FIG. 35 is a flowchart of the other part of the interrupt routine algorithm for the program executed by the CPU in the sixth embodiment of the invention.
Figure 36:
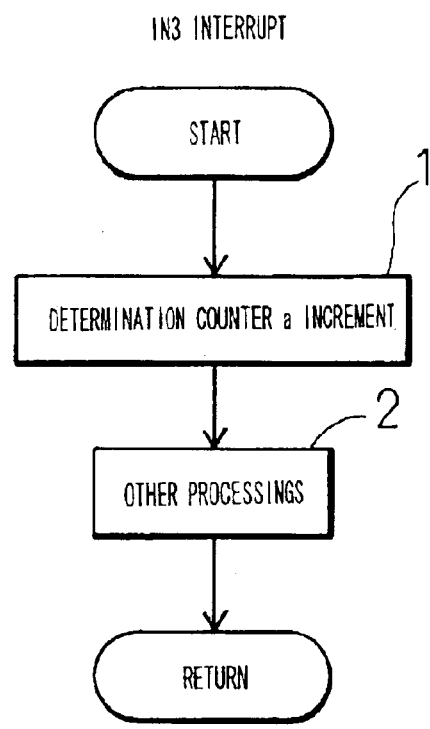
FIG. 36 is a flowchart of another interrupt routine algorithm for the program executed by the CPU in the sixth embodiment of the invention.
Figure 37:
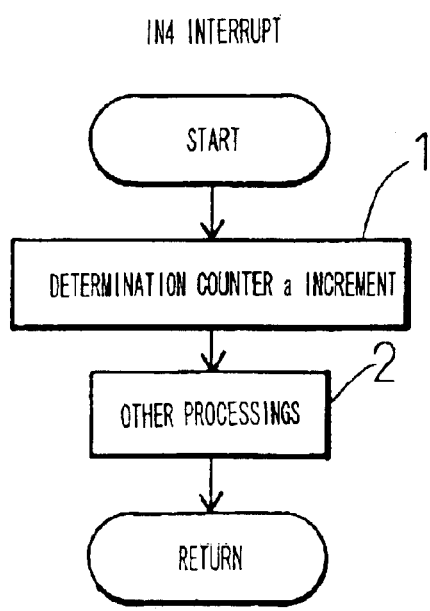
FIG. 37 is a flowchart of a further interrupt routine algorithm for the program executed by the CPU in the sixth embodiment of the invention.

According to the algorithm, when the first sensor 3 generates the leading edge detection pulse Vtf, an IN1 interrupt in FIGS. 34 and 35 is executed, and when the second sensor 4 generates the leading edge detection pulse Vpf and the trailing edge detection pulse Vpr, an IN3 interrupt in FIG. 36 and an IN4 interrupt in FIG. 37, respectively are executed.

In the IN3 interrupt in FIG. 36, a count of a determination counter a is incremented by 1 in Step 1. Then, other necessary processings are performed in Step 2, then returning to a main routine. In the IN4 interrupt in FIG. 37, a determination counter a is incremented by 1 in Step 1, and other necessary processings are performed in Step 2, then returning to a main routine.

In the IN1 interrupt in FIGS. 34 and 35, it is determined whether this IN1 interrupt is the first interrupt in Step 1 in FIG. 34. When determined as the first interrupt, a first passage flag is set in Step 2, and the count of the determination counter a is set to 0 in Step 3, returning to the main routine. When not determined as the first IN1 interrupt (when it is not determined that the first passage flag is set) in Step 1, it is determined whether the rotational direction detection has completed in Step 4. When it is determined that the rotational direction detection has not completed, the process goes to Step 5 to determine whether the count of the determination counter a is 0, and when the count of the determination counter a is 0, the process returns to the main routine. When it is not determined that the count of the determination counter a is 0 (1 or 2) in Step 5, it is determined whether the count of the determination counter a is 2 in Step 6. When it is determined that the count of the determination counter a is 2, a determination result that the rotational direction of the engine is reverse is stored in Step 7, and a processing for storing information that the rotational direction detection has completed is performed in Step 8. When it is not determined that the count of the determination counter a is 2 (0 or 3), a determination result that the rotational direction of the engine is forward is stored in Step 9. Then, the process goes to Step 8 to complete the rotational direction discrimination.

When the processing for storing the information that the rotational direction detection has completed is performed in Step 8, or when it is determined that the rotational direction detection has completed in Step 4, it is determined whether the rotational direction of the engine is forward in Step in FIG. 35. When the rotational direction is forward, the process goes to Step 11 to determine whether the count of the determination counter a is 0, and when the count of the determination counter a is 0, a determination result that the pulse now generated by the first sensor corresponds to the second cylinder is stored. Then, a processing for storing information that the cylinder discrimination has completed is performed in Step 13, the count of the determination counter a is set to 0 in Step 14, and other processings are performed in Step 15, then returning to the main routine.

When it is not determined that the count of the determination counter a is 0 in Step 11, the process goes to Step 16 to determine whether the count of the determination counter a is 1. When the count of the determination counter a is 1, it is determined that the pulse now generated by the first sensor corresponds to the first cylinder in Step 17, and the process goes to Step 13. When it is not determined that the count of the determination counter a is 1 in Step 16, it is determined that the pulse now generated by the first sensor corresponds to the third cylinder in Step 18, and the process goes to Step 13.

When it is not determined that the rotational direction of the engine is forward in Step 10, it is determined whether the count of the determination counter a is 0 in Step 19, and when the count of the determination counter a is 0, the process goes to Step 20 to determine that the pulse now generated by the first sensor corresponds to the third cylinder. Then, a determination flag b is set to 1 in Step 21, and the process goes to Step 13 to complete the cylinder discrimination. When it is not determined that the count of the determination counter a is 0 in Step 19, the process goes to Step 22 to determine whether the determination flag b is 1. When it is determined that the determination flag b is 1, a determination result that the pulse now generated by the first sensor corresponds to the second cylinder is stored in Step 23, the determination flag b is set to 0 in Step 24. Then, the process goes to Step 13 to complete the cylinder discrimination. When it is not determined that the determination flag b is 1, a determination result that the pulse now generated by the first sensor corresponds to the second cylinder is stored in Step 25. Then, the process goes to Step 13 to complete the cylinder discrimination.

Also in this embodiment, three pulses: the trailing edge detection pulse generated by the first sensor, and the leading edge detection pulse and the trailing edge detection pulse generated by the second sensor, may be used to discriminate the rotational direction and the cylinder.

In this case, the rotational direction discrimination means may be comprised so as to discriminate the rotational direction of the internal combustion engine based on a phase relationship between the trailing edge detection pulse generated by the first sensor and the leading edge detection pulse and the trailing edge detection pulse generated by the second sensor.

The cylinder discrimination means may be comprised so as to discriminate which cylinder of the internal combustion engine the pulse generated by the first sensor corresponds to, using a feature that the number of pulses generated by the second sensor between when the first sensor of the signal generator detects the trailing edge of the first series of reluctor corresponding to the first cylinder of the internal combustion engine to generate the trailing edge detection pulse and when the first sensor detects the trailing edge of the first series of reluctor corresponding to the second cylinder of the internal combustion engine to generate the trailing edge detection pulse is different from the number of pulses generated by the second sensor between when the first sensor detects the trailing edge of the first series of reluctor corresponding to the second cylinder of the internal combustion engine to generate the trailing edge detection pulse and when the first sensor detects the trailing edge of the first series of reluctor corresponding to the third cylinder of the internal combustion engine to generate the trailing edge detection pulse, and different from the number of pulses generated by the second sensor between when the first sensor detects the trailing edge of the first series of reluctor corresponding to the third cylinder of the internal combustion engine to generate the trailing edge detection pulse and when the first sensor detects the trailing edge of the first series of reluctor corresponding to the first cylinder of the internal combustion engine to generate the trailing edge detection pulse.

Other Embodiments

In the above described embodiments, the polarity of the pulse generated when the first sensor and the second sensor detect the leading edge in the rotational direction of the reluctor is negative, and the polarity of the pulse generated when the first sensor and the second sensor detect the trailing edge in the rotational direction of the reluctor is positive. However, the polarity of the pulse generated when the first sensor and the second sensor detect the leading edge in the rotational direction of the reluctor may be positive, and the polarity of the pulse generated when the first sensor and the second sensor detect the trailing edge in the rotational direction of the reluctor may be negative.

In the above described embodiments, the pulses having the same polarity (negative in the above described embodiment) are generated when the first sensor and the second sensor detect the leading edge in the rotational direction of the reluctor, and the pulses having the same polarity (positive in the above described embodiment) are generated when the first sensor and the second sensor detect the trailing edge in the rotational direction of the reluctor. However, pulses having different polarities may be generated when the first sensor and the second sensor detect the leading edge in the rotational direction of the reluctor and when the first sensor and the second sensor detect the trailing edge in the rotational direction of the reluctor.

In the above described embodiments, the first series of reluctor and the second series of reluctor are provided on the common rotor yoke, but the first series of reluctor and the second series of reluctor may be provided on different rotor yokes.

As described above, according to the invention, the signal generator comprises: the rotor having the first series of reluctor corresponding to the cylinder of the internal combustion engine and the second series of reluctor having the predetermined phase relationship relative to the first series of reluctor; and the first sensor and the second sensor that detect the first series of reluctor and the second series of reluctor of the rotor to generate the pulses, thus causing the difference in the phase relationship between the output pulse of the first sensor and the output pulse of the second sensor in the forward rotation and in the reverse rotation of the engine. Therefore, detecting the various events caused by the difference in the phase relationship may provide the rotation information such as the information on the rotational direction of the engine, or the information on the cylinder corresponding to the pulse generated by the first sensor. Further, the difference in the phase relationship between the output pulse of the first sensor and the output pulse of the second sensor may be detected without measuring the time interval between the pulses, thus the precise information on the rotational direction of the engine may be obtained even when the engine runs at extremely low speed at which the rotational speed of the crankshaft varies.

Although some preferred embodiments of the invention have been described and illustrated with reference to the accompanying drawings, it will be understood by those skilled in the art that they are by way of examples, and that various changes and modifications may be made without departing from the spirit and scope of the invention, which is defined only to the appended claims.

What is claimed is:

1. A signal generator for a multi-cylinder internal combustion engine, used for detecting rotation information of the multi-cylinder internal combustion engine having two or more cylinders, comprising:

a rotor in the form of an inductor having a first series of reluctors as many as cylinders of said internal combustion engine, that are provided correspondingly to each cylinder of said internal combustion engine and are rotated together with a crankshaft around a central axis of said crankshaft of said internal combustion engine, and a second series of at least one reluctor that is provided in a position shifted axially along said crankshaft relative to said first series of reluctors and is rotated together with said first series of reluctors;

a first sensor that detects a leading edge and a trailing edge in a rotational direction of said first series of reluctors of said rotor to generate a leading edge detection pulse and a trailing edge detection pulse having different polarities; and a second sensor that detects a leading edge and a trailing edge in a rotational direction of the second series of reluctor of said rotor to generate a leading edge detection pulse and a trailing edge detection pulse having different polarities, wherein polar arc angles of said first and said second series of reluctors, a positional relationship between said first and said second sensors, and a positional relationship between said first and said second series of reluctors are set so that said second sensor detects the leading edge or the trailing edge of the second series of one reluctor to generate one pulse while said first sensor sequentially detects at least one leading edge and at least one trailing edge of said first series of reluctors to generate the leading edge detection pulse and the trailing edge detection pulse.

2. A signal generator for a multi-cylinder internal combustion engine, used for detecting rotation information of the multi-cylinder internal combustion engine having a first cylinder and a second cylinder, comprising:

a rotor in the form of an inductor having a first series of two reluctors that are placed at a substantially 180° interval in a rotational direction of a crankshaft of said internal combustion engine correspondingly to two cylinders of said internal combustion engine and are rotated together with said crankshaft around a central axis of said crankshaft, and a second series of at least one reluctor that is provided in a position shifted axially along said crankshaft relative to said first series of reluctors and is rotated together with said first series of reluctors;

a first sensor that detects a leading edge and a trailing edge in each rotational direction of the first series of two reluctors of said rotor to generate a leading edge detection pulse and a trailing edge detection pulse having different polarities; and a second sensor that detects a leading edge and a trailing edge in a rotational direction of the second series of reluctor of said rotor to generate a leading edge detection pulse and a trailing edge detection pulse having different polarities, wherein polar arc angles of said first and said second series of reluctors, a positional relationship between said first and said second sensors, and a positional relationship between said first and said second series of reluctors are set so that said second sensor detects the leading edge or the trailing edge of the second series of one reluctor to generate either of the leading edge detection pulse or the trailing edge detection pulse while said first sensor sequentially detects the leading edge and the trailing edge of one of the first series of two reluctors to generate the leading edge detection pulse and the trailing edge detection pulse, and so that said second sensor generates no pulse while said first sensor sequentially detects the leading edge and the trailing edge of the other of the first series of two reluctors to generate the leading edge detection pulse and the trailing edge detection pulse.

3. A signal generator for a multi-cylinder internal combustion engine, used for detecting rotation information including information on a rotational direction of the multi-cylinder internal combustion engine having first to third cylinders, comprising:

a rotor in the form of an inductor having a first series of three reluctors that are placed at substantially 120° intervals in a rotational direction of a crankshaft of said internal combustion engine correspondingly to three cylinders of said internal combustion engine and are rotated together with said crankshaft around a central axis of said crankshaft, and a second series of at least one reluctor that is provided in a position shifted axially along said crankshaft relative to said first series of reluctors and is rotated together with said first series of reluctors;

a first sensor that detects a leading edge and a trailing edge in a rotational direction of each of the first series of three reluctors of said rotor to generate a leading edge detection pulse and a trailing edge detection pulse having different polarities; and a second sensor that detects a leading edge and a trailing edge in a rotational direction of each of the second series of two reluctors of said rotor to generate a leading edge detection pulse and a trailing edge detection pulse having different polarities, wherein polar arc angles of said first and said second series of reluctors, a positional relationship between said first and said second sensors, and a positional relationship between said first and said second series of reluctors are set so that said second sensor detects the leading edge or the trailing edge of the second series of one reluctor to generate the leading edge detection pulse or the trailing edge detection pulse while said first sensor sequentially detects the leading edge and the trailing edge of one of the first series of three reluctors to generate the leading edge detection pulse and the trailing edge detection pulse, so that said second sensor detects the leading edge and the trailing edge of the second series of another reluctor to generate the leading edge detection pulse or the trailing edge detection pulse while said first sensor sequentially detects the leading edge and the trailing edge of another of the first series of three reluctors to generate the leading edge detection pulse and the trailing edge detection pulse, and so that said second sensor detects no pulse while said first sensor sequentially detects the leading edge and the trailing edge of further one of said first series of three reluctors to generate the leading edge detection pulse and the trailing edge detection pulse.

4. A rotation information detector for detecting rotation information of a multi-cylinder internal combustion engine having two or more cylinders, comprising:

a rotor in the form of an inductor having a first series of reluctors as many as cylinders of said internal combustion engine, that are provided correspondingly to each cylinder of said internal combustion engine and are rotated together with a crankshaft around a central axis of said crankshaft of said internal combustion engine, and a second series of at least one reluctor that is provided in a position shifted axially along said crankshaft relative to said first series of reluctors and is rotated together with said first series of reluctors;

a first sensor that detects a leading edge and a trailing edge in a rotational direction of said first series of reluctors of said rotor to generate a leading edge detection pulse and a trailing edge detection pulse having different polarities;

a second sensor that detects a leading edge and a trailing edge in a rotational direction of the second series of reluctor of said rotor to generate a leading edge detection pulse and a trailing edge detection pulse having different polarities;

rotational direction discrimination means for discriminating the rotational direction of said internal combustion engine based on a phase relationship between the leading edge detection pulse and the trailing edge detection pulse generated by said first sensor and the leading edge detection pulse and the trailing edge detection pulse generated by said second sensor; and cylinder discrimination means for discriminating that, when said second sensor generates one pulse while said first sensor sequentially generates the leading edge detection pulse and the trailing edge detection pulse, the leading edge detection pulse and the trailing edge detection pulse sequentially generated by said first sensor correspond to a particular cylinder of said internal combustion engine, wherein polar arc angles of said first and said second series of reluctors, a positional relationship between said first and said second sensors, and a positional relationship between said first and said second series of reluctors are set so that said second sensor detects the leading edge or the trailing edge of the second series of one reluctor to generate one pulse while said first sensor sequentially detects at least one leading edge and at least one trailing edge of said first series of reluctors to generate the leading edge detection pulse and the trailing edge detection pulse.

5. The rotation information detector for a multi-cylinder internal combustion engine according to claim 4, wherein said rotational direction discrimination means is comprised so as to discriminate the rotational direction of said internal combustion engine from a polarity of a pulse generated by said second sensor between when said first sensor generates the leading edge detection pulse and when said first sensor generates the trailing edge detection pulse.

6. A rotation information detector for detecting rotation information including information on a rotational direction of a multi-cylinder internal combustion engine having a first cylinder and a second cylinder, comprising:

a rotor in the form of an inductor having a first series of two reluctors that are placed at a substantially 180° interval in a rotational direction of a crankshaft of said internal combustion engine correspondingly to two cylinders of said internal combustion engine and are rotated together with said crankshaft around a central axis of said crankshaft, and a second series of at least one reluctor that is provided in a position shifted axially along said crankshaft relative to said first series of reluctors and is rotated together with said first series of reluctors;

a first sensor that detects a leading edge and a trailing edge in each rotational direction of the first series of two reluctors of said rotor to generate a leading edge detection pulse and a trailing edge detection pulse having different polarities;

a second sensor that detects a leading edge and a trailing edge in a rotational direction of the second series of reluctor of said rotor to generate a leading edge detection pulse and a trailing edge detection pulse having different polarities;

rotational direction discrimination means for discriminating the rotational direction of said internal combustion engine based on a phase relationship between the leading edge detection pulse and the trailing edge detection pulse generated by said first sensor and the leading edge detection pulse and the trailing edge detection pulse generated by said second sensor; and cylinder discrimination means for discriminating that, when said second sensor generates the leading edge detection pulse or the trailing edge detection pulse while the first sensor of said signal generator sequentially detects the leading edge and the trailing edge of one of said first series of two reluctors to generate the leading edge detection pulse and the trailing edge detection pulse, the leading edge detection pulse and the trailing edge detection pulse generated when said first sensor detects the leading edge and the trailing edge of one of said first series of reluctors correspond to one cylinder of said internal combustion engine, and for discriminating that, when the second sensor generates no pulse while said first sensor sequentially detects the leading edge and the trailing edge of the other of said first series of reluctors to sequentially generate the leading edge detection pulse and the trailing edge detection pulse, the leading edge detection pulse and the trailing edge detection pulse generated when the first sensor detects the leading edge and the trailing edge of the other of the first series of reluctors correspond to the other cylinder of the internal combustion engine, wherein polar arc angles of said first and said second series of reluctors, a positional relationship between said first and said second sensors, and a positional relationship between said first and said second series of reluctors are set so that said second sensor detects the leading edge or the trailing edge of the second series of one reluctor to generate either of the leading edge detection pulse or the trailing edge detection pulse while said first sensor sequentially detects the leading edge and the trailing edge of one of the first series of two reluctors to generate the leading edge detection pulse and the trailing edge detection pulse, and so that said second sensor generates no pulse while said first sensor sequentially detects the leading edge and the trailing edge of the other of the first series of two reluctors to generate the leading edge detection pulse and the trailing edge detection pulse.

7. The rotation information detector for a multi-cylinder internal combustion engine according to claim 6, wherein said rotational direction discrimination means is comprised so as to discriminate the rotational direction of said internal combustion engine from a polarity of a pulse generated by said second sensor between when said first sensor generates the leading edge detection pulse and when said first sensor generates the trailing edge detection pulse.

8. A rotation information detector for detecting rotation information including information on a rotational direction of a multi-cylinder internal combustion engine having first to third cylinders, comprising:

a rotor in the form of an inductor having a first series of three reluctors that are placed at substantially 120° intervals in a rotational direction of a crankshaft of said internal combustion engine correspondingly to three cylinders of said internal combustion engine and are rotated together with said crankshaft around a central axis of said crankshaft, and a second series of at least one reluctor that is provided in a position shifted axially along said crankshaft relative to said first series of reluctors and is rotated together with said first series of reluctors;

a first sensor that detects a leading edge and a trailing edge in a rotational direction of each of the first series of three reluctors of said rotor to generate a leading edge detection pulse and a trailing edge detection pulse having different polarities;

a second sensor that detects a leading edge and a trailing edge in a rotational direction of each of the second series of two reluctors of said rotor to generate a leading edge detection pulse and a trailing edge detection pulse having different polarities;

rotational direction discrimination means for discriminating the rotational direction of said internal combustion engine based on a phase relationship between the leading edge detection pulse and the trailing edge detection pulse generated by said first sensor and the leading edge detection pulse and the trailing edge detection pulse generated by said second sensor; and cylinder discrimination means for discriminating that, when said second sensor generates the leading edge detection pulse or the trailing edge detection pulse while said first sensor of said signal generator sequentially detects the leading edge and the trailing edge of one of said first series of three reluctors to generate the leading edge detection pulse and the trailing edge detection pulse, the leading edge detection pulse and the trailing edge detection pulse generated when said first sensor detects the leading edge and the trailing edge of one of said first series of three reluctors correspond to one cylinder of the internal combustion engine, for discriminating that, when said second sensor generates the leading edge detection pulse and the trailing edge detection pulse while said first sensor sequentially detects the leading edge and the trailing edge of another of the first series of three reluctors to generate the leading edge detection pulse and the trailing edge detection pulse, the leading edge detection pulse and the trailing edge detection pulse generated when said first sensor detects the leading edge and the trailing edge of another of said first series of three reluctors correspond to another cylinder of said internal combustion engine, and for discriminating that, when said second sensor generates no pulse while said first sensor sequentially detects the leading edge and the trailing edge of further one of said first series of reluctors to generate the leading edge detection pulse and the trailing edge detection pulse, the leading edge detection pulse and the trailing edge detection pulse generated when said first sensor detects the leading edge and the trailing edge of further one of said first series of three reluctors correspond to a further cylinder of said internal combustion engine, wherein polar arc angles of said first and said second series of reluctors, a positional relationship between said first and said second sensors, and a positional relationship between said first and said second series of reluctors are set so that said second sensor detects the leading edge or the trailing edge of the second series of one reluctor to generate the leading edge detection pulse or the trailing edge detection pulse while said first sensor sequentially detects the leading edge and the trailing edge of one of the first series of three reluctors to generate the leading edge detection pulse and the trailing edge detection pulse, so that said second sensor detects the leading edge and the trailing edge of the second series of another reluctor to generate the leading edge detection pulse or the trailing edge detection pulse while said first sensor sequentially detects the leading edge and the trailing edge of another of the first series of three reluctors to generate the leading edge detection pulse and the trailing edge detection pulse, and so that said second sensor detects no pulse while said first sensor sequentially detects the leading edge and the trailing edge of further one of said first series of three reluctors to generate the leading edge detection pulse and the trailing edge detection pulse.

9. The rotation information detector for a multi-cylinder internal combustion engine according to claim 7, wherein said rotational direction discrimination means is comprised so as to discriminate the rotational direction of said internal combustion engine from a polarity of a pulse generated by said second sensor between when said first sensor generates the leading edge detection pulse and when said first sensor generates the trailing edge detection pulse.

10. A rotation information detector for detecting rotation information of a multi-cylinder internal combustion engine having two or more cylinders, comprising:

a rotor in the form of an inductor having a first series of reluctors as many as cylinders of said internal combustion engine, that are provided correspondingly to each cylinder of said internal combustion engine and are rotated together with a crankshaft around a central axis of said crankshaft of said internal combustion engine, and a second series of at least one reluctor that is provided in a position shifted axially along said crankshaft relative to said first series of reluctors and is rotated together with said first series of reluctors;

a first sensor that detects a leading edge and a trailing edge in a rotational direction of said first series of reluctors of said rotor to generate a leading edge detection pulse and a trailing edge detection pulse having different polarities;

a second sensor that detects a leading edge and a trailing edge in a rotational direction of the second series of reluctor of said rotor to generate a leading edge detection pulse and a trailing edge detection pulse having different polarities;

rotational direction discrimination means for discriminating the rotational direction of said internal combustion engine based on a phase relationship between a pulse with one polarity generated by said first sensor and the leading edge detection pulse and the trailing edge detection pulse generated by said second sensor; and cylinder discrimination means for discriminating which cylinder of the internal combustion engine the pulse generated by said first sensor corresponds to, from a polarity or the number of pulses generated by said second sensor between when said first sensor generates said pulse with one polarity and when said first sensor generates a pulse with the same polarity again, wherein polar arc angles of said first and said second series of reluctors, a positional relationship between said first and said second sensors, and a positional relationship between said first and said second series of reluctors are set so that said second sensor detects the leading edge or the trailing edge of the second series of one reluctor to generate one pulse while said first sensor sequentially detects at least one leading edge and at least one trailing edge of said first series of reluctors to generate the leading edge detection pulse and the trailing edge detection pulse.

11. A rotation information detector for detecting rotation information of a multi-cylinder internal combustion engine having two or more cylinders, comprising:

a rotor in the form of an inductor having a first series of reluctors as many as cylinders of said internal combustion engine, that are provided correspondingly to each cylinder of said internal combustion engine and are rotated together with a crankshaft around a central axis of said crankshaft of said internal combustion engine, and a second series of at least one reluctor that is provided in a position shifted axially along said crankshaft relative to said first series of reluctors and is rotated together with said first series of reluctors;

a first sensor that detects a leading edge and a trailing edge in a rotational direction of said first series of reluctors of said rotor to generate a leading edge detection pulse and a trailing edge detection pulse having different polarities;

a second sensor that detects a leading edge and a trailing edge in a rotational direction of the second series of reluctor of said rotor to generate a leading edge detection pulse and a trailing edge detection pulse having different polarities;

rotational direction discrimination means for discriminating the rotational direction of said internal combustion engine based on a phase relationship between the leading edge detection pulse generated by said first sensor and the leading edge detection pulse and the trailing edge detection pulse generated by said second sensor; and cylinder discrimination means for discriminating which cylinder of the internal combustion engine the pulse generated by said first sensor corresponds to, from a polarity or the number of pulses generated by said second sensor between when said first sensor generates one leading edge detection pulse and when said first sensor generates a next leading edge detection pulse, wherein polar arc angles of said first and said second series of reluctors, a positional relationship between said first and said second sensors, and a positional relationship between said first and said second series of reluctors are set so that said second sensor detects the leading edge or the trailing edge of the second series of one reluctor to generate one pulse while said first sensor sequentially detects at least one leading edge and at least one trailing edge of said first series of reluctors to generate the leading edge detection pulse and the trailing edge detection pulse.

12. A rotation information detector for detecting rotation information of a multi-cylinder internal combustion engine having two or more cylinders, comprising:

a rotor in the form of an inductor having a first series of reluctors as many as cylinders of said internal combustion engine, that are provided correspondingly to each cylinder of said internal combustion engine and are rotated together with a crankshaft around a central axis of said crankshaft of said internal combustion engine, and a second series of at least one reluctor that is provided in a position shifted axially along said crankshaft relative to said first series of reluctors and is rotated together with said first series of reluctors;

a first sensor that detects a leading edge and a trailing edge in a rotational direction of said first series of reluctors of said rotor to generate a leading edge detection pulse and a trailing edge detection pulse having different polarities;

a second sensor that detects a leading edge and a trailing edge in a rotational direction of the second series of reluctor of said rotor to generate a leading edge detection pulse and a trailing edge detection pulse having different polarities;

rotational direction discrimination means for discriminating the rotational direction of said internal combustion engine based on a phase relationship between the trailing edge detection pulse generated by said first sensor and the leading edge detection pulse and the trailing edge detection pulse generated by said second sensor; and cylinder discrimination means for discriminating which cylinder of the internal combustion engine the pulse generated by said first sensor corresponds to, from a polarity or the number of pulses generated by said second sensor between when said first sensor generates one trailing edge detection pulse and when said first sensor generates a next trailing edge detection pulse, wherein polar arc angles of said first and said second series of reluctors, a positional relationship between said first and said second sensors, and a positional relationship between said first and said second series of reluctors are set so that said second sensor detects the leading edge or the trailing edge of the second series of one reluctor to generate one pulse while said first sensor sequentially detects at least one leading edge and at least one trailing edge of said first series of reluctors to generate the leading edge detection pulse and the trailing edge detection pulse.

13. A rotation information detector for detecting rotation information including information on a rotational direction of a multi-cylinder internal combustion engine having a first cylinder and a second cylinder, comprising:

a rotor in the form of an inductor having a first series of two reluctors that are placed at a substantially 180° interval in a rotational direction of a crankshaft of said internal combustion engine correspondingly to two cylinders of said internal combustion engine and are rotated together with said crankshaft around a central axis of said crankshaft, and a second series of at least one reluctor that is provided in a position shifted axially along said crankshaft relative to said first series of reluctors and is rotated together with said first series of reluctors;

a first sensor that detects a leading edge and a trailing edge in each rotational direction of the first series of two reluctors of said rotor to generate a leading edge detection pulse and a trailing edge detection pulse having different polarities;

a second sensor that detects a leading edge and a trailing edge in a rotational direction of the second series of reluctor of said rotor to generate a leading edge detection pulse and a trailing edge detection pulse having different polarities;

rotational direction discrimination means for discriminating the rotational direction of said internal combustion engine based on a phase relationship between the leading edge detection pulse generated by said first sensor and the leading edge detection pulse and the trailing edge detection pulse generated by said second sensor; and cylinder discrimination means for discriminating which cylinder of said internal combustion engine the pulse generated by said first sensor corresponds to, using a feature that a polarity or the number of pulses generated by said second sensor between when said first sensor detects the leading edge of the first series of reluctor corresponding to the first cylinder of said internal combustion engine to generate the leading edge detection pulse and when said first sensor detects the leading edge of the first series of reluctor corresponding to the second cylinder of said internal combustion engine to generate the leading edge detection pulse is different from a polarity or the number of pulses generated by said second sensor between when said first sensor detects the leading edge of the first series of reluctor corresponding to the second cylinder of said internal combustion engine to generate the leading edge detection pulse and when said first sensor detects the leading edge of the first series of reluctor corresponding to the first cylinder of said internal combustion engine to generate the leading edge detection pulse, wherein polar arc angles of said first and said second series of reluctors, a positional relationship between said first and said second sensors, and a positional relationship between said first and said second series of reluctors are set so that said second sensor detects the leading edge or the trailing edge of the second series of one reluctor to generate either of the leading edge detection pulse or the trailing edge detection pulse while said first sensor sequentially detects the leading edge and the trailing edge of one of the first series of two reluctors to generate the leading edge detection pulse and the trailing edge detection pulse, and so that said second sensor generates no pulse while said first sensor sequentially detects the leading edge and the trailing edge of the other of the first series of two reluctors to generate the leading edge detection pulse and the trailing edge detection pulse.

14. A rotation information detector for detecting rotation information including information on a rotational direction of a multi-cylinder internal combustion engine having a first cylinder and a second cylinder, comprising:

a rotor in the form of an inductor having a first series of two reluctors that are placed at a substantially 180° interval in a rotational direction of a crankshaft of said internal combustion engine correspondingly to two cylinders of said internal combustion engine and are rotated together with said crankshaft around a central axis of said crankshaft, and a second series of at least one reluctor that is provided in a position shifted axially along said crankshaft relative to said first series of reluctors and is rotated together with said first series of reluctors;

a first sensor that detects a leading edge and a trailing edge in each rotational direction of the first series of two reluctors of said rotor to generate a leading edge detection pulse and a trailing edge detection pulse having different polarities;

a second sensor that detects a leading edge and a trailing edge in a rotational direction of the second series of reluctor of said rotor to generate a leading edge detection pulse and a trailing edge detection pulse having different polarities;

rotational direction discrimination means for discriminating the rotational direction of said internal combustion engine based on a phase relationship between the trailing edge detection pulse generated by said first sensor and the leading edge detection pulse and the trailing edge detection pulse generated by said second sensor; and cylinder discrimination means for discriminating which cylinder of said internal combustion engine the pulse generated by said first sensor corresponds to, using a feature that a polarity or the number of pulses generated by said second sensor between when said first sensor of said signal generator detects the trailing edge of the first series of reluctor corresponding to the first cylinder of said internal combustion engine to generate the trailing edge detection pulse and when said first sensor detects the trailing edge of the first series of reluctor corresponding to the second cylinder of said internal combustion engine to generate the trailing edge detection pulse is different from a polarity or the number of pulses generated by said second sensor between when said first sensor detects the trailing edge of the first series of reluctor corresponding to the second cylinder of said internal combustion engine to generate the trailing edge detection pulse and when said first sensor detects the trailing edge of the first series of reluctor corresponding to the first cylinder of said internal combustion engine to generate the trailing edge detection pulse, wherein polar arc angles of said first and said second series of reluctors, a positional relationship between said first and said second sensors, and a positional relationship between said first and said second series of reluctors are set so that said second sensor detects the leading edge or the trailing edge of the second series of one reluctor to generate either of the leading edge detection pulse or the trailing edge detection pulse while said first sensor sequentially detects the leading edge and the trailing edge of one of the first series of two reluctors to generate the leading edge detection pulse and the trailing edge detection pulse, and so that said second sensor generates no pulse while said first sensor sequentially detects the leading edge and the trailing edge of the other of the first series of two reluctors to generate the leading edge detection pulse and the trailing edge detection pulse.

15. A rotation information detector for detecting rotation information including information on a rotational direction of a multi-cylinder internal combustion engine having first to third cylinders, comprising:

a rotor in the form of an inductor having a first series of three reluctors that are placed at substantially 120° intervals in a rotational direction of a crankshaft of said internal combustion engine correspondingly to three cylinders of said internal combustion engine and are rotated together with said crankshaft around a central axis of said crankshaft, and a second series of at least one reluctor that is provided in a position shifted axially along said crankshaft relative to said first series of reluctors and is rotated together with said first series of reluctors;

a first sensor that detects a leading edge and a trailing edge in a rotational direction of each of the first series of three reluctors of said rotor to generate a leading edge detection pulse and a trailing edge detection pulse having different polarities;

a second sensor that detects a leading edge and a trailing edge in a rotational direction of each of the second series of two reluctors of said rotor to generate a leading edge detection pulse and a trailing edge detection pulse having different polarities;

rotational direction discrimination means for discriminating the rotational direction of said internal combustion engine based on a phase relationship between the leading edge detection pulse generated by said first sensor and the leading edge detection pulse and the trailing edge detection pulse generated by said second sensor; and cylinder discrimination means for discriminating which cylinder of said internal combustion engine the pulse generated by said first sensor corresponds to, using a feature that the number of pulses generated by said second sensor between when said first sensor detects the leading edge of the first series of reluctor corresponding to the first cylinder of said internal combustion engine to generate the leading edge detection pulse and when said first sensor detects the leading edge of the first series of reluctor corresponding to the second cylinder of said internal combustion engine to generate the leading edge detection pulse is different from the number of pulses generated by said second sensor between when said first sensor detects the leading edge of the first series of reluctor corresponding to the second cylinder of said internal combustion engine to generate the leading edge detection pulse and when said first sensor detects the leading edge of the first series of reluctor corresponding to the third cylinder of said internal combustion engine to generate the leading edge detection pulse, and different from the number of pulses generated by said second sensor between when said first sensor detects the leading edge of the first series of reluctor corresponding to the third cylinder of said internal combustion engine to generate the leading edge detection pulse and when said first sensor detects the leading edge of the first series of reluctor corresponding to the first cylinder of said internal combustion engine to generate the leading edge detection pulse, wherein polar arc angles of said first and said second series of reluctors, a positional relationship between said first and said second sensors, and a positional relationship between said first and said second series of reluctors are set so that said second sensor detects the leading edge or the trailing edge of the second series of one reluctor to generate the leading edge detection pulse or the trailing edge detection pulse while said first sensor sequentially detects the leading edge and the trailing edge of one of the first series of three reluctors to generate the leading edge detection pulse and the trailing edge detection pulse, so that said second sensor detects the leading edge and the trailing edge of the second series of another reluctor to generate the leading edge detection pulse or the trailing edge detection pulse while said first sensor sequentially detects the leading edge and the trailing edge of another of the first series of three reluctors to generate the leading edge detection pulse and the trailing edge detection pulse, and so that said second sensor detects no pulse while said first sensor sequentially detects the leading edge and the trailing edge of further one of said first series of three reluctors to generate the leading edge detection pulse and the trailing edge detection pulse.

16. A rotation information detector for detecting rotation information including information on a rotational direction of a multi-cylinder internal combustion engine having first to third cylinders, comprising:

a rotor in the form of an inductor having a first series of three reluctors that are placed at substantially 120° intervals in a rotational direction of a crankshaft of said internal combustion engine correspondingly to three cylinders of said internal combustion engine and are rotated together with said crankshaft around a central axis of said crankshaft, and a second series of at least one reluctor that is provided in a position shifted axially along said crankshaft relative to said first series of reluctors and is rotated together with said first series of reluctors;

a first sensor that detects a leading edge and a trailing edge in a rotational direction of each of the first series of three reluctors of said rotor to generate a leading edge detection pulse and a trailing edge detection pulse having different polarities;

a second sensor that detects a leading edge and a trailing edge in a rotational direction of each of the second series of two reluctors of said rotor to generate a leading edge detection pulse and a trailing edge detection pulse having different polarities;

rotational direction discrimination means for discriminating the rotational direction of said internal combustion engine based on a phase relationship between the trailing edge detection pulse generated by said first sensor and the leading edge detection pulse and the trailing edge detection pulse generated by said second sensor; and cylinder discrimination means for discriminating which cylinder of said internal combustion engine the pulse generated by said first sensor corresponds to, using a feature that the number of pulses generated by said second sensor between when said first sensor of said signal generator detects the trailing edge of the first series of reluctor corresponding to the first cylinder of said internal combustion engine to generate the trailing edge detection pulse and when said first sensor detects the trailing edge of the first series of reluctor corresponding to the second cylinder of said internal combustion engine to generate the trailing edge detection pulse is different from the number of pulses generated by said second sensor between when said first sensor detects the trailing edge of the first series of reluctor corresponding to the second cylinder of said internal combustion engine to generate the trailing edge detection pulse and when said first sensor detects the trailing edge of the first series of reluctor corresponding to the third cylinder of said internal combustion engine to generate the trailing edge detection pulse, and different from the number of pulses generated by said second sensor between when said first sensor detects the trailing edge of the first series of reluctor corresponding to the third cylinder of said internal combustion engine to generate the trailing edge detection pulse and when said first sensor detects the trailing edge of the first series of reluctor corresponding to the first cylinder of said internal combustion engine to generate the trailing edge detection pulse, wherein polar arc angles of said first and said second series of reluctors, a positional relationship between said first and said second sensors, and a positional relationship between said first and said second series of reluctors are set so that said second sensor detects the leading edge or the trailing edge of the second series of one reluctor to generate the leading edge detection pulse or the trailing edge detection pulse while said first sensor sequentially detects the leading edge and the trailing edge of one of the first series of three reluctors to generate the leading edge detection pulse and the trailing edge detection pulse, so that said second sensor detects the leading edge and the trailing edge of the second series of another reluctor to generate the leading edge detection pulse or the trailing edge detection pulse while said first sensor sequentially detects the leading edge and the trailing edge of another of the first series of three reluctors to generate the leading edge detection pulse and the trailing edge detection pulse, and so that said second sensor detects no pulse while said first sensor sequentially detects the leading edge and the trailing edge of further one of said first series of three reluctors to generate the leading edge detection pulse and the trailing edge detection pulse.

* * * * *